United States Patent
Dhanda et al.

(10) Patent No.: US 11,202,007 B1
(45) Date of Patent: Dec. 14, 2021

(54) CAMERA MOVEMENT CONTROL FOR REDUCED POWER CONSUMPTION

(71) Applicant: Apple Inc., Cupertino, CA (US)

(72) Inventors: Abhishek Dhanda, San Ramon, CA (US); Santiago Alban, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/024,009

(22) Filed: Sep. 17, 2020

Related U.S. Application Data

(60) Provisional application No. 62/907,209, filed on Sep. 27, 2019.

(51) Int. Cl.
*H04N 5/232* (2006.01)
*H04N 5/225* (2006.01)

(52) U.S. Cl.
CPC ....... *H04N 5/23241* (2013.01); *H04N 5/2258* (2013.01); *H04N 5/23229* (2013.01)

(58) Field of Classification Search
None
See application file for complete search history.

(56) References Cited

U.S. PATENT DOCUMENTS

| | | | |
|---|---|---|---|
| 4,218,121 A * | 8/1980 | Nakagawa | G03B 9/07 396/508 |
| 7,458,738 B2 | 12/2008 | Tomatsu | |
| 7,634,187 B2 | 12/2009 | Li et al. | |
| 7,747,159 B2 | 6/2010 | Uenishi | |
| 2002/0018140 A1 * | 2/2002 | Suemoto | H04N 5/2254 348/240.3 |
| 2012/0062780 A1 * | 3/2012 | Morihisa | H04N 5/23212 348/333.13 |
| 2013/0308934 A1 * | 11/2013 | Yamanaka | G02B 7/28 396/133 |
| 2018/0091737 A1 * | 3/2018 | Kadambala | H04B 10/60 |
| 2018/0241922 A1 * | 8/2018 | Baldwin | H04N 5/23241 |

FOREIGN PATENT DOCUMENTS

| | | |
|---|---|---|
| JP | 2003262788 | 9/2003 |
| JP | 4349302 | 9/2006 |
| JP | 2008092619 | 4/2008 |

OTHER PUBLICATIONS

U.S. Appl. No. 17/011,804, filed Sep. 3, 2020, Abhishek Dhanda et al.

* cited by examiner

*Primary Examiner* — William B Perkey
(74) *Attorney, Agent, or Firm* — Robert C. Kowert; Kowert, Hood, Munyon, Rankin & Goetzel, P.C.

(57) ABSTRACT

Various embodiments include camera movement control for reduced power consumption. Some embodiments, for example, may include operating a camera module in a power saving mode, in which focus movement control may be synchronized with frame capture. According to some examples, such synchronization may include holding a position (e.g., a focus position) of a lens group and/or an image sensor of the camera module during some integration time periods. Furthermore, such synchronization may include enabling power saving movement (e.g., between a focus position and a neutral position) of the lens group and/or the image sensor during some other time periods, such as during intervals (e.g., blanking intervals) between integration time periods, and/or during integration time periods for image frames that are expendable.

20 Claims, 9 Drawing Sheets

CAMERA MOVEMENT CONTROL FOR REDUCED POWER CONSUMPTION

This application claims benefit of priority to U.S. Provisional Application No. 62/907,209, filed Sep. 27, 2019, tilted "Camera Movement Control for Reduced Power Consumption", which is hereby incorporated by reference in its entirety.

BACKGROUND

Technical Field

This disclosure relates generally to camera movement control for reduced power consumption.

Description of the Related Art

The advent of small, mobile multipurpose devices such as smartphones and tablet or pad devices has resulted in a need for high-resolution, small form factor cameras for integration in the devices. Some cameras may incorporate optical image stabilization (OIS) mechanisms that may sense and react to external excitation/disturbance by adjusting location of the optical lens on the X and/or Y axis in an attempt to compensate for unwanted motion of the lens. Furthermore, some cameras may incorporate an autofocus (AF) mechanism whereby the object focal distance can be adjusted to focus an object plane in front of the camera at an image plane to be captured by the image sensor. In some such AF mechanisms, the optical lens is moved as a single rigid body along the optical axis of the camera to refocus the camera.

Figure 1:
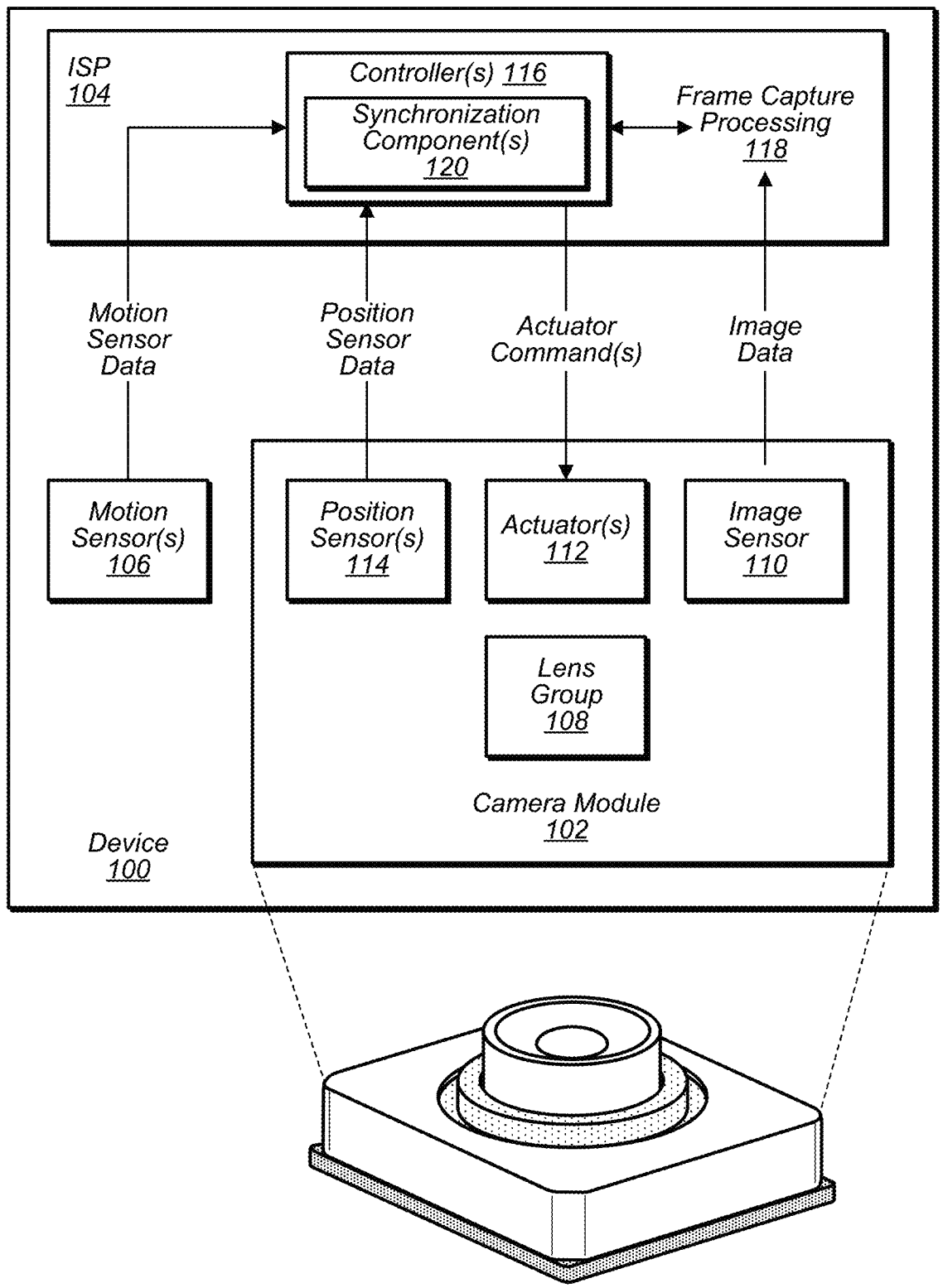
FIG. 1 illustrates a block diagram of example components of a device that may implement camera movement control for reduced power consumption, in accordance with some embodiments. In various embodiments, a camera module of the device may be operated in a power saving mode in which focus movement control is based at least in part on integration timing.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Various embodiments described herein relate to camera movement control for reduced power consumption. Some embodiments, for example, may include operating a camera module in a power saving mode, in which focus movement control may be synchronized with frame capture. In some embodiments, a camera module may include an actuator for moving a lens group relative to an image sensor and/or for moving the image sensor relative to the lens group. For example, the actuator may move the lens group and/or the image sensor to focus (e.g., autofocus (AF)) the camera module with respect to an image and/or to stabilize the image (e.g., optical image stabilization (OIS)).

According to some non-limiting embodiments, the actuator may be controlled so that the timing of holding a position (e.g., a focus position) of the lens group and/or the image sensor is based at least in part on the timing of integration for image capture. Additionally, or alternatively, the actuator may be controlled so as to enable, during blanking intervals between image frames, power saving movement (e.g., in a focus direction) that may reduce power consumption in a system. According to some examples, the power saving movement may comprise movement of the lens group and/or the image sensor between a focus position (and/or a last-held position) and a neutral position. For example, the neutral position may be a "zero power" location and/or a position at which the lens group and/or the image sensor would settle in a resting state when no current is provided to the actuator. As compared to some other systems, such as those that do not enable power saving movement but instead hold a focus position throughout integration and blanking intervals, a system according to embodiments of this disclosure may consume less power by implementing camera movement control that is synchronized with frame capture as discussed herein.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

As mentioned above, various embodiments include implementing camera movement control for reduced power consumption. FIG. 1 shows a block diagram of example components of a device 100 that may implement such camera movement control. As discussed in further detail herein, in various embodiments the device 100 may implement synchronization of focus movement control (and/or OIS movement control) with frame capture.

In some embodiments, the device 100 may include a camera module 102, an image signal processor (ISP) 104, and/or one or more motion sensors 106 (e.g., a gyroscope, an accelerometer, etc.). The camera module 102 may include a lens group 108, an image sensor 110, one or more actuators 112 (e.g., a voice coil motor (VCM) actuator) to move the lens group 108 and/or the image sensor 110, and/or one or more position sensors 114. The lens group 108 may include one or more lens elements. The image sensor 110 may be configured to capture light that has passed through the lens group 108. In some embodiments, the actuator(s) 112 may be configured to move the lens 108 and/or the image sensor 110 along an optical axis of the camera module 102 to provide zoom and/or focus functionality. In some embodiments, the optical axis may be defined by the lens group 108. According to some embodiments, the optical axis may be defined by the image sensor 110. Additionally, or alternatively, the actuator(s) 112 may be configured to move the lens group 108 and/or the image sensor 110 in directions orthogonal to the optical axis, e.g., to provide OIS functionality.

In some examples, the ISP 104 may include a controller 116 that outputs actuator commands to control the actuator(s) 112 of the camera module 102. The term "controller" may be used herein to refer to one or more controllers and/or one or more processors. In some embodiments, some or all of the functionality of the controller 116 described herein may be performed by one or more other controllers and/or one or more other processors of the device 100 (and/or of the camera module 102).

In some embodiments, to provide OIS functionality, the controller 116 may receive as inputs motion sensor data (e.g., associated with movement of the device 100 and/or the camera module 102) from the motion sensor(s) 106 and/or position sensor data (e.g., associated with OIS positioning of the lens group 108 and/or the image sensor 110) from the position sensor(s) 114. The controller 116 may use the motion sensor data and/or the position sensor data in determining OIS movement control of the actuator(s) 112 such that the lens group 108 and/or the image sensor 110 are moved to a suitable position to compensate for movement of the device 100 and stabilize image capture.

In various embodiments, to provide zoom and/or focus functionality (e.g., AF), the controller 116 may receive as inputs frame capture data (e.g., associated with image frames generated for images captured via the camera module 102) and/or position sensor data (e.g., associated with focus positioning of the lens group 108 and/or the image sensor 110) from the position sensor(s). According to various embodiments, image data from the image sensor 110 may be provided as input to the ISP 104 for frame capture processing 118. The frame capture processing 118 may include generating image frames based at least in part on the image data received from the image sensor 110.

In various embodiments, while the camera module 102 is active (e.g., when the device 100 is in a photography mode), the camera module 102 may continuously capture image frames. According to some examples, these image frames may be used to generate a preview stream on a display (e.g., display 712 in FIG. 7) of the device 100. The image frames may be deleted at some point after they are captured, unless kept for use in creating a captured photo and/or a video. For example, when a user wants to take a photograph, the user may request an image capture (e.g., by pressing on a button or designated portion of a display of the device 100, via voice activation, etc.), and the device 100 may take a number of the image frames for use in an image fusion process to generate a final image. As successive image frames may be used in generation of the final image in some examples, and because at the time of capture it may not be known whether a given frame will be used, it may be desirable to maximize the quality of individual image frames and minimize blur and/or artifacts that may be introduced during the focusing process, e.g., by using the synchronized camera movement control functionality described herein.

According to various embodiments, the camera module 102 may be operable in one or more modes. In some embodiments, the camera module 102 may be operable in a mode in which focus movement control is synchronized with frame capture for reduced power consumption. For example, such a mode may comprise a power saving mode in which focus movement control is based at least in part on integration timing. In various embodiments, the controller 116 may include one or more synchronization components 120 configured to enable, at least in part, the synchronized camera movement control functionality described herein. In some non-limiting examples, the synchronization component(s) 120 may include an actuator controller timer that may be used in driving movement (e.g., AF and/or OIS movement) of the lens group and/or the image sensor 110 via the actuator 112. Furthermore, in some examples, the synchronization component(s) 120 may include a frame capture timer that may be used in driving frame capture.

In some embodiments, when operating the camera module 102 in the power saving mode, the controller 116 may be configured to read data associated with frame capture, and determine (e.g., based on the data) when the image sensor is being exposed for image capture. Periods of time in which the image sensor is being exposed for image capture may be utilized, e.g., to maintain a focus position of the camera module 102, and periods of time in which the image sensor is not being exposed for image capture may be utilized, e.g., to enable power saving movement of the lens group 108 and/or the image sensor 110 (e.g., movement between the focus position and a neutral position so as to enable reduced power consumption). According to various embodiments discussed herein, the image sensor "being exposed" means that the image sensor is actively measuring the light incident on the image sensor, and the image sensor "not being exposed" means that the image sensor is not actively measuring the light incident on the image sensor. In some examples, during one or more time periods in which the image sensor is being exposed for image capture, the controller 116 may control the actuator 112 in accordance with one or more position maintenance drive signals to hold the lens group 108 and/or the image sensor 110 such that the lens group 108 and the image sensor 110 do not move relative to each other in a focus direction (e.g., a direction parallel to an optical axis of the camera module 102). Furthermore, during one or more time periods in which the image sensor is not being exposed for image capture (and/or during integration when capturing an image frame determined to be "expendable" as discussed herein with reference to at least FIGS. 2 and 5), the controller 116 may control the actuator 112 in accordance with one or more power saving drive signals to enable movement of the lens group 108 and/or the image sensor 110 between a last-held position and a neutral position. According to various embodiments, controlling the actuator 112 in accordance with the power saving drive signal(s) may consume less power than controlling the actuator 112 in accordance with the position maintenance drive signal(s). Furthermore, some embodiments of the power saving mode may include changing one or more control driver settings. For example, an operating mode of the controller 116 may switch from a linear drive mode to a pulse width modulation (PWM) drive mode when the camera module 102 is being operated in the power saving mode.

The arrangement shown in FIG. 1 is a non-limiting example. It should be understood that the device 100 may have any other suitable arrangement of components in various embodiments. For example, the controller(s) 116 may be included in the camera module 102, such that at least some of the actuator commands are determined in the camera module 102. The arrangement may include information streams between the camera module 102 and the ISP 104.

Figure 2:
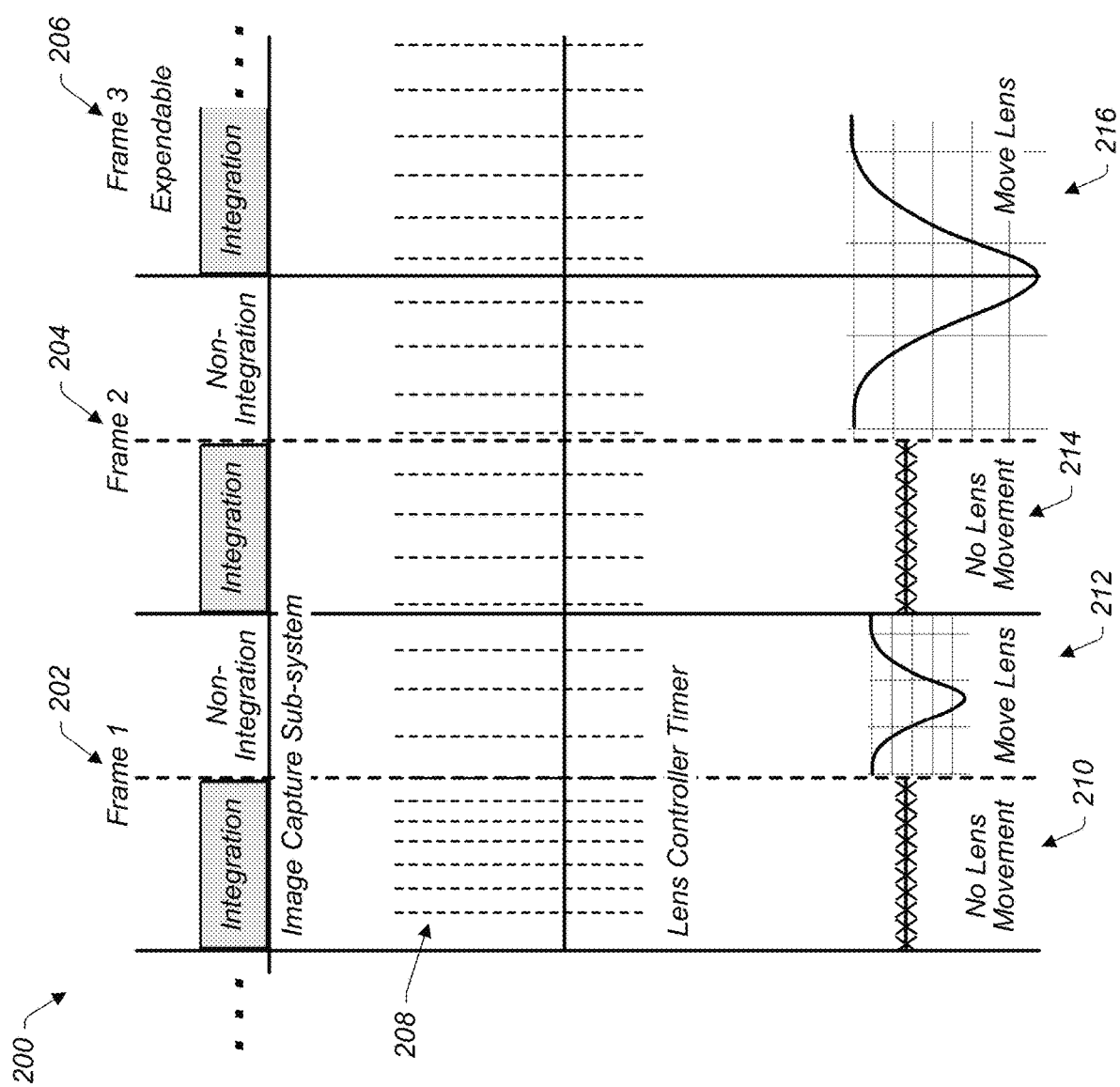
FIG. 2 illustrates a schematic diagram of an example synchronization scenario in which the timing of lens movement is synchronized with frame capture for reduced power consumption, in accordance with some embodiments.
Figure 3:
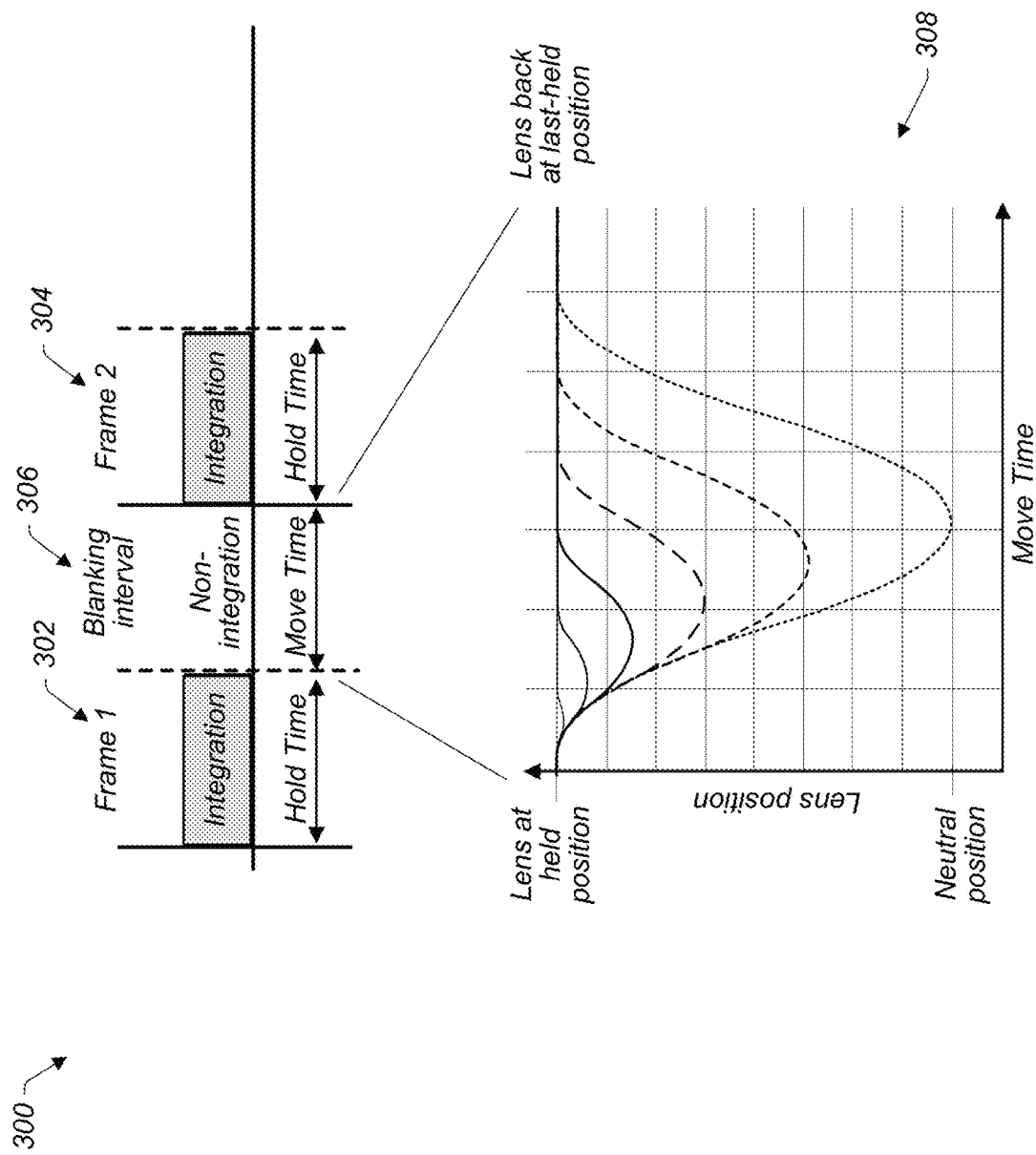
FIG. 3 illustrates a schematic diagram of another example synchronization scenario in which the timing of lens movement is synchronized with frame capture for reduced power consumption, in accordance with some embodiments.

Various embodiments disclosed herein may be described as including a lens group being moved for focus positioning of a camera module. For example, FIGS. 2-3 illustrate example synchronization scenarios in which the timing of lens movement is synchronized with frame capture. It should be understood, however, that in various embodiments the focus positioning may additionally, or alternatively, include an image sensor being moved for focus positioning of the camera module.

FIG. 2 shows an example synchronization scenario 200 in which the timing of lens movement is synchronized with frame capture for reduced power consumption. In various embodiments, the lens movement control may be based at least in part on integration timing (e.g., timing associated with an image sensor being exposed for image capture).

In some embodiments, the synchronization scenario 200 may include capture, via a camera module (e.g., camera module 102 in FIG. 1), of a first frame 202, a second frame 204, and a third frame 206. For instance, the first frame 202, the second frame 204, and the third frame 206 may be consecutively captured. As indicated in FIG. 2, each of the first frame 202, the second frame 204, and the third frame 206 may include a respective integration portion associated with a respective time period in which an image sensor (e.g., image sensor 110 in FIG. 1) is being exposed for image capture, and a respective non-integration portion associated with a respective time period in which the image sensor is not being exposed for image capture. In various examples, the non-integration portion may be associated with one or more blanking intervals. The dotted lines 208 may represent the timing (e.g., determined based at least in part on a lens controller timer) of drive signals from the controller (e.g., controller 116 in FIG. 1) to provide synchronized lens movement control via the actuator. Note that the drive signal frequency indicated in FIG. 2 is not intended to be drawn to scale, but rather intended to indicate that in various embodiments the drive signal frequency is faster than the frame rate.

According to some embodiments, during the integration portion of the first frame 202, the drive signals from the controller may comprise position maintenance drive signals to hold 210 the lens (e.g., lens group 108 in FIG. 1) at a position (e.g., a current position, a desired focus position, etc.). In some embodiments, the position maintenance drive signals may hold the lens at a position along an optical axis of the camera module (e.g., an optical axis defined by the lens and/or the image sensor), e.g., such that the lens group and the image sensor do not move relative to each other in a focus direction. Additionally, or alternatively, during the integration portion of the first frame 202, the drive signals from the controller may comprise OIS drive signals to move the lens and/or the image sensor in one or more directions orthogonal to the optical axis, e.g., to provide OIS functionality.

According to some embodiments, during the non-integration portion of the first frame 202, the drive signals from the controller may comprise power saving drive signals to move 212 the lens (and/or the image sensor) between a last-held position and a neutral position (e.g., a position at which less power is consumed relative to holding the lens at the last-held position during the integration portion). Similarly, during the integration portion of the second frame 204, the drive signals from the controller may comprise position maintenance drive signals to hold 214 the lens at a position along the optical axis and/or OIS drive signals to move the lens and/or the image sensor in one or more directions orthogonal to the optical axis.

In various embodiments, a determination may be made (e.g., by the controller) as to whether one or more image frames are "expendable," and/or a determination may be made (e.g., by the controller) as to whether one or more image frames are not expendable (also referred to herein as "non-expendable"). The term "expendable" may be used herein to describe image frames during which power saving movement of the lens (and/or the image sensor) may be enabled, e.g., via power saving drive signal(s) from the controller. In some examples, an expendable image frame may be filtered out and/or discarded, e.g., due to an undesirable amount of image blur (and/or one or more other undesirable characteristics associated with the image) that may result from the power saving movement occurring during an integration time period associated with the expendable image frame.

In various embodiments described herein (e.g., with reference to FIGS. 2 and 5), one or more frames may be designated as expendable based at least in part on device motion. For example, if there is significant device motion and it is determined that earlier frames are not going to be relevant to a later capture request, one or more expendable frames may be designated, e.g., when the motion has settled down. As a non-limiting example, lens motion (from device motion) may be monitored during the lens holding periods and compared to a threshold amount of motion. If the detected motion is above the threshold, one or more frames may be designated as expendable. As another non-limiting example, one or more frames may be designated as expendable if there are a threshold number of frames during which the lens will not be able to achieve the target focus position during the movement periods. Non-linearity of the actuator control may also factor into these calculations, as there may be variation in response for the same step size at different points in the stroke. For example, the response associated with moving from a neutral position to a position that is 50 um from neutral in a given direction may be different than the response associated with moving from a position that is 200 um from neutral to a position that is 250 um from neutral.

In synchronization scenario 200, the first frame 202 and the second frame 204 may be determined to be non-expendable, and the third frame 206 may be determined to be expendable according to some non-limiting examples. Based at least in part on the determination that the first frame 202 and the second frame 204 are non-expendable, the lens may be held during integration time periods of the first frame 202 and the second frame 204. Based at least in part on the determination that the third frame 206 is expendable, an integration time period of the third frame 206 may be utilized as time that is available for enabling power saving movement. As indicated in FIG. 2, during the non-integration portion of the second frame 204 and the integration portion of the expendable third frame 206, the drive signals from the controller may comprise power saving drive signals to move 216 the lens and/or the image sensor between the last-held position and the neutral position.

FIG. 3 shows another example synchronization scenario 300 in which the timing of lens movement is synchronized with frame capture for reduced power consumption. In various embodiments, the lens movement control may be based at least in part on integration timing.

In some embodiments, the synchronization scenario 300 may include capture, via a camera module (e.g., camera module 102 in FIG. 1), of a first frame 302 and a second frame 304. For instance, the first frame 302 and the second frame 304 may be consecutively captured. As indicated in FIG. 3, each of the first frame 302 and the second frame 304 may include a respective integration portion associated with a respective time period in which an image sensor (e.g., image sensor 110 in FIG. 1) is being exposed for image capture. Furthermore, synchronization scenario 300 includes a non-integration portion 306 associated with a time period in which the image sensor is not being exposed for image capture. For example, as indicated in FIG. 3, the non-integration portion 306 may comprise a blanking interval between the integration portions associated with the first frame 302 and the second frame 304.

According to some examples, the integration portions associated with the first frame 302 and the second frame 304 may be considered hold times during which the lens is held at a position (e.g., a desired focus position) in accordance with position maintenance drive signal(s) from the controller (e.g., controller 116 in FIG. 1). Furthermore, the blanking interval 306 (and/or non-integration portion) may be considered move time 306 that is available for enabling power saving movement of the lens, e.g., in accordance with power saving drive signal(s) from the controller. In some non-limiting examples, the integration portions may not be considered available for enabling power saving movement, based at least in part on a determination that the first frame 302 and the second frame 304 are non-expendable image frames.

FIG. 3 includes a plot 308 indicating examples of lens positioning over different amounts of move time that may be available (e.g., during the blanking interval 306) for enabling power saving movement of the lens. As plot 308 indicates, the lens may be moved from a held position towards a neutral position, and back to the last-held position within the available move time. For instance, the lens may be returned to the last-held position at or before the end of the blanking interval 306. As plot 308 also indicates, the lens may be increasingly moved closer to the neutral position as the available move time increases. In some examples, the available move time may be sufficiently long so as to allow for the lens to move all the way to the neutral position. However, as plot 308 indicates, in various examples the lens may only move part of a range of distance spanning between the last-held position and the neutral position.

While FIGS. 2 and 3 indicate that the lens may be moved from a held position towards a neutral position, and back to the last-held position (e.g., a target focus position), it should be understood that, instead of moving the lens back to the last-held position, the lens may be moved to a different position (e.g., a new target focus position) in various embodiments. As an example, during video capture the focus position may change over the course of capturing the video, and the lens movement may be correspondingly updated to move towards new target focus positions during available move times.

Figure 4:
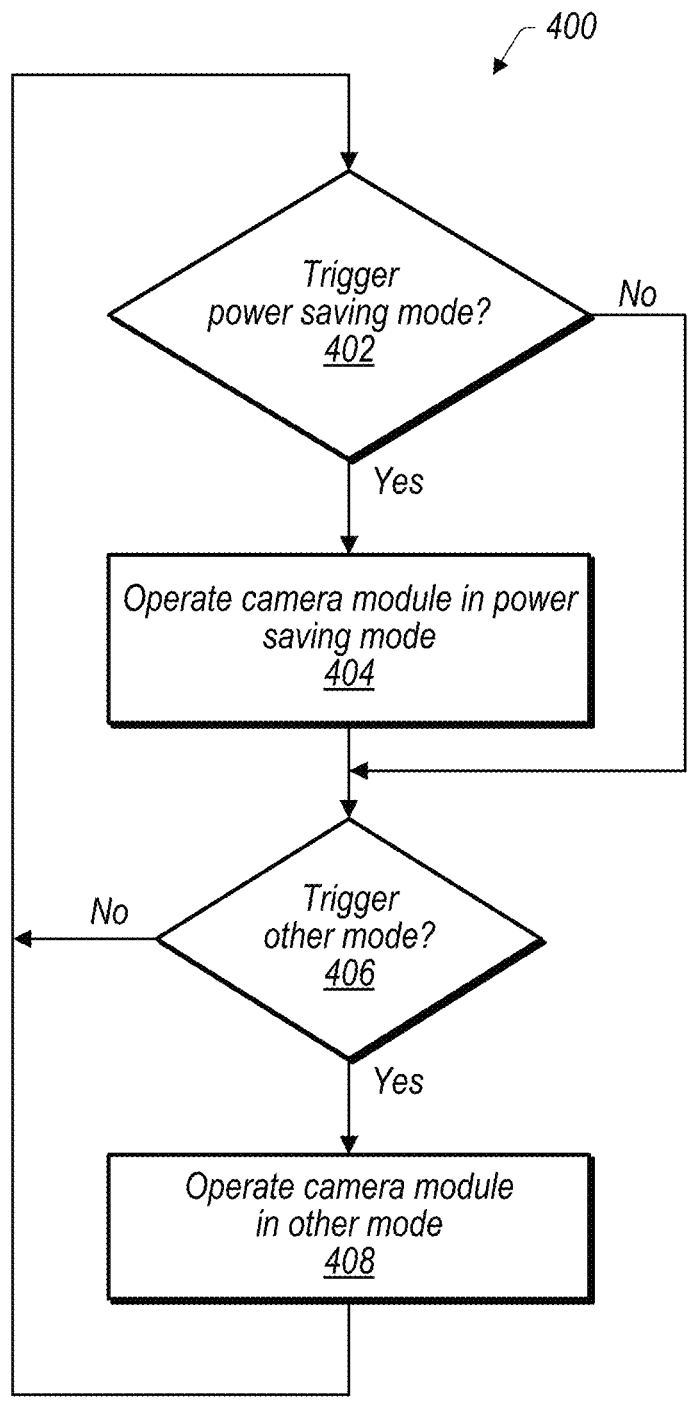
FIG. 4 is a flowchart of an example method of operating a camera module in a power saving mode and/or operating the camera module in one or more other modes, in accordance with some embodiments.

FIG. 4 is a flowchart of an example method 400 of operating a camera module (e.g., camera module 102 in FIG. 1) in a power saving mode and/or operating the camera module in one or more other modes. At 402, the method 400 may include determining whether a power saving mode is triggered, e.g., so as to cause a switch from operating the camera module in one or more currently-enabled modes to operating the camera module in the power saving mode. In some embodiments, the power saving mode may be triggered based at least in part on one or more user selections and/or one or more metrics (e.g., associated with battery charge level, device settings, camera behavior, ambient information, etc.). In some non-limiting examples, a controller (e.g., controller 116 in FIG. 1) may switch from operating the camera module in another mode to operating the camera module in the power saving mode in response to a determination to initiate the power saving mode (e.g., based on a determination that the power saving mode is triggered). Additionally, or alternatively, the camera module may be configured to operate in a default mode that saves power. In some embodiments, the power saving mode may be the default mode. In other embodiments, when in the default mode that saves power, the camera module may behave in a manner similar to, but different from, the power saving mode. For example, the camera module, when in the default mode, may be a more conservative (in terms of amount of lens movement during an available move time) version of the power saving mode. For instance, when compared to lens movements in the power saving mode, there may be less movement of the lens towards the neutral position and/or the lens may be returned to the target focus position earlier in the default mode. In some embodiments, whether the camera module is to be operated in the default mode or the power saving mode may be determined on a frame-by-frame basis, e.g., based at least in part on whether a threshold amount of power can be saved and/or a threshold amount of lens recovery can be achieved before the next frame.

If, at 402, it is determined that the power saving mode is triggered, then the method 400 may include operating the camera module in the power saving mode, at 404. For example, focus movement control may be based at least in part on integration timing (e.g., as discussed herein with reference to at least FIGS. 1-3 and 5). As discussed in further detail with reference to FIG. 5, when operating the camera module in the power saving mode, the controller may be configured to control, during integration time period(s) (in which the image sensor is being exposed for image capture), the actuator in accordance with position maintenance drive signal(s) to hold the lens group and/or the image sensor such that the lens group and the image sensor do not move relative to each other in a focus direction (e.g., a direction parallel to an optical axis defined by the lens group and/or the image sensor). Additionally, or alternatively, the controller may be configured to control, during non-integration time period(s) (in which the image sensor is not being exposed for image capture), the actuator in accordance with power saving drive signals to enable power saving movement of the lens group and/or the image sensor, e.g., between a last-held position (e.g., a focus position held just prior to the power saving movement) and a neutral position. According to various embodiments, controlling the actuator in accordance with the power saving drive signal(s) may consume less power than controlling the actuator in accordance with the position maintenance drive signal(s).

If, at 402, it is determined that the power saving mode is not triggered, then the method 400 may include continuing to operate the camera module in the currently-enabled mode(s) and/or determine whether one or more other modes are triggered, at 406. Furthermore, the method 400 may continue to evaluate whether the power saving mode is triggered, at 402.

As noted above, the method 400 may include determining, at 406, whether one or more other modes are triggered, e.g., so as to cause a switch from operating the camera module in the power saving mode to operating the camera in the other mode(s). In some embodiments, the other mode(s) may include a mode that is different from the power saving mode and that may be referred to herein as the "other mode." According to some examples, the other mode may be triggered based at least in part on one or more user selections and/or one or more metrics (e.g., associated with battery charge level, device settings, camera behavior, ambient information, etc.). In a non-limiting example, the controller may switch from operating the camera in the power saving mode to operating the camera in the other mode (and/or the mode that was the enabled before the power saving mode) in response to the user deselecting an option/setting associated with the power saving mode and/or in response to a change in one or more metrics that satisfies a condition for the mode switch.

If, at 406, it is determined that the other mode is not triggered, then the method 400 may include continuing to evaluate whether the power saving mode is triggered, at 402. If, at 406, it is determined that the other mode is triggered, then the method 400 may include operating the camera module in the other mode, at 408. In some examples, when operating the camera module in the other mode, the controller may be configured to control the actuator without regard to integration timing for purposes of reducing power consumption. In a non-limiting example, when operating the camera module in the other mode, the controller may be configured to control the actuator in accordance with one or more drive signals to hold the lens group and/or the image sensor such that the lens group and the image sensor do not move relative to each other in the focus direction, e.g., throughout (i) a first frame capture time period in which a first image frame is captured and (ii) a blanking interval between the first frame capture time period and a second frame capture time period in which a second image frame is captured. In this non-limiting example, the first image frame and the second image frame may be consecutively captured. In various examples, when operating the camera module in the other mode, the method 400 may include continuing to evaluate whether the power saving mode is triggered, at 402.

Figure 5:
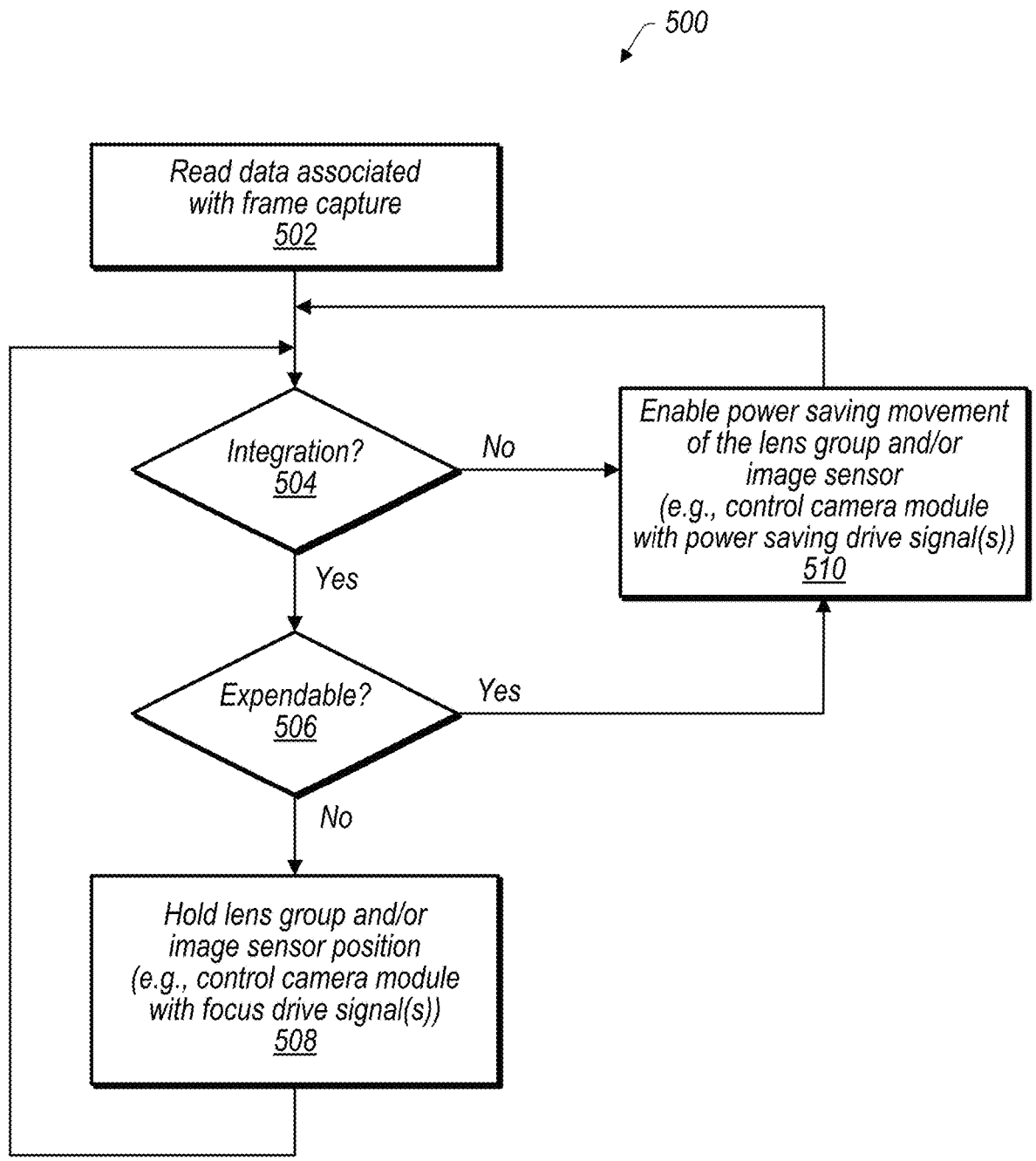
FIG. 5 is a flowchart of an example method of implementing camera movement control for reduced power consumption, in accordance with some embodiments.

FIG. 5 is a flowchart of an example method 500 of implementing camera movement control for reduced power consumption. At 502, the method 500 may include reading data associated with frame capture. For example, the data may comprise line data associated with lines of an image frame.

At 504, the method 500 may include determining whether an integration time period is occurring. For example, the controller may determine, based at least in part on the data associated the frame capture (which the controller may read at 502), whether the image sensor is being exposed for image capture.

If, at 504, it is determined that the image sensor is being exposed (e.g., an integration time period is occurring), then the method 500 may consider whether the corresponding image frame is expendable, at 506. If, at 506, the image frame is non-expendable, then the method 500 may include holding a position of the lens group and/or the image sensor, at 608. In some examples, the controller may be configured to control, during the integration time period, the actuator in accordance with one or more position maintenance drive signals to hold the lens group and/or the image sensor such that the lens group and/or the image sensor do not move relative to each other in the focus direction. Additionally, or alternatively, the controller may be configured to control, during the integration time period, the actuator in accordance with one or more OIS drive signals to move the lens group and/or the image sensor in one or more directions orthogonal to the focus direction, e.g., to provide OIS movement.

If, at 504, it is determined that the image sensor is not being exposed (e.g., a non-integration time period is occurring), then the method 500 may include enabling power saving movement of the lens group and/or the image sensor, at 510. In some examples, the controller may be configured to control, during the non-integration time period (e.g., a blanking interval between consecutive integration time periods), the actuator in accordance with one or more power saving drive signals to move the lens group and/or the image sensor between a last-held position and a neutral position. For example, the neutral position may be zero-power location and/or a position at which the lens group and/or the image sensor would settle in a resting state when no current is provided to the actuator. Furthermore, if the image frame is determined to be expendable (see 506), then the method 500 may utilize the corresponding integration time period (also referred to herein as an "expendable integration time period") for enabling power saving movement of the lens group and/or the image sensor.

In a non-limiting example, a first time period and a second time period (that is longer than the first time period) may be utilized for enabling power saving movement. Each of the first time period and the second time period may include a respective non-integration time period and/or a respective expendable integration time period. Based at least in part on the second time period being longer than the first time period, the controller may control the actuator in accordance with the power saving drive signal(s) so as to position the lens group and/or the image sensor closer to the neutral position during the second time period than during the first time period.

According to various examples, the actuator may be driven via drive currents provided to the actuator. As a non-limiting example, the actuator may comprise a VCM actuator having one or more magnets and one or more coils. Drive currents may be provided to the coil(s), and the magnet(s) and coil(s) may magnetically interact to produce Lorentz forces that cause the lens group and/or the image sensor to move.

In some non-limiting examples, to control the actuator in accordance with one or more position maintenance drive signals, the controller may determine one or more position maintenance drive currents to provide to at least one coil such that the VCM actuator hold the lens group and/or the image sensor at a desired hold position (e.g., a focus position). Additionally, or alternatively, to control the actuator in accordance with one or more power saving signals, the controller may determine one or more power saving drive currents to provide to at least one coil to enable power saving movement of the lens group and/or the image sensor. The power saving drive current(s) may be lower, on average, than the position maintenance current(s), and thus power consumption may be reduced by using the power saving drive current(s) instead of the position maintenance current(s), e.g., during a non-integration time period and/or an expendable integration time period.

In various examples, a discrete time period utilized for enabling power saving movement of the lens group and/or the image sensor may include a non-integration time period (e.g., a blanking interval) and/or an expendable integration time period. In some non-limiting examples, the controller may determine a first time period and a second time period that are different subsets of the discrete time period. For example, the controller may determine the first time period for a step-down of current provided to at least one coil, e.g., a step-down from a position maintenance drive current to a power saving drive current. Furthermore, the controller may determine the second time period (e.g., succeeding the first time period) for a step-up of current provided to the coil(s), e.g., a step-up from the power saving drive current to the position maintenance drive current.

In a non-limiting example, a first time period and a second time period may be utilized for enabling power saving movement. Each of the first time period and the second time period may include a respective non-integration time period and/or a respective expendable integration time period. The controller may determine, based at least in part on a first duration of the first time period, a first power saving drive signal associated with a first drive current provided to the actuator during the first time period. Furthermore, the controller may determine, based at least in part on a second duration (that is different than the first duration) of the second time period, a second power saving time signal associated with a second drive current provided to the actuator during the second time period. The second drive current may be different than the first drive current based on the second duration being different than the first duration. Furthermore, in some non-limiting examples, the first drive current or the second drive current may be zero.

Figure 6:
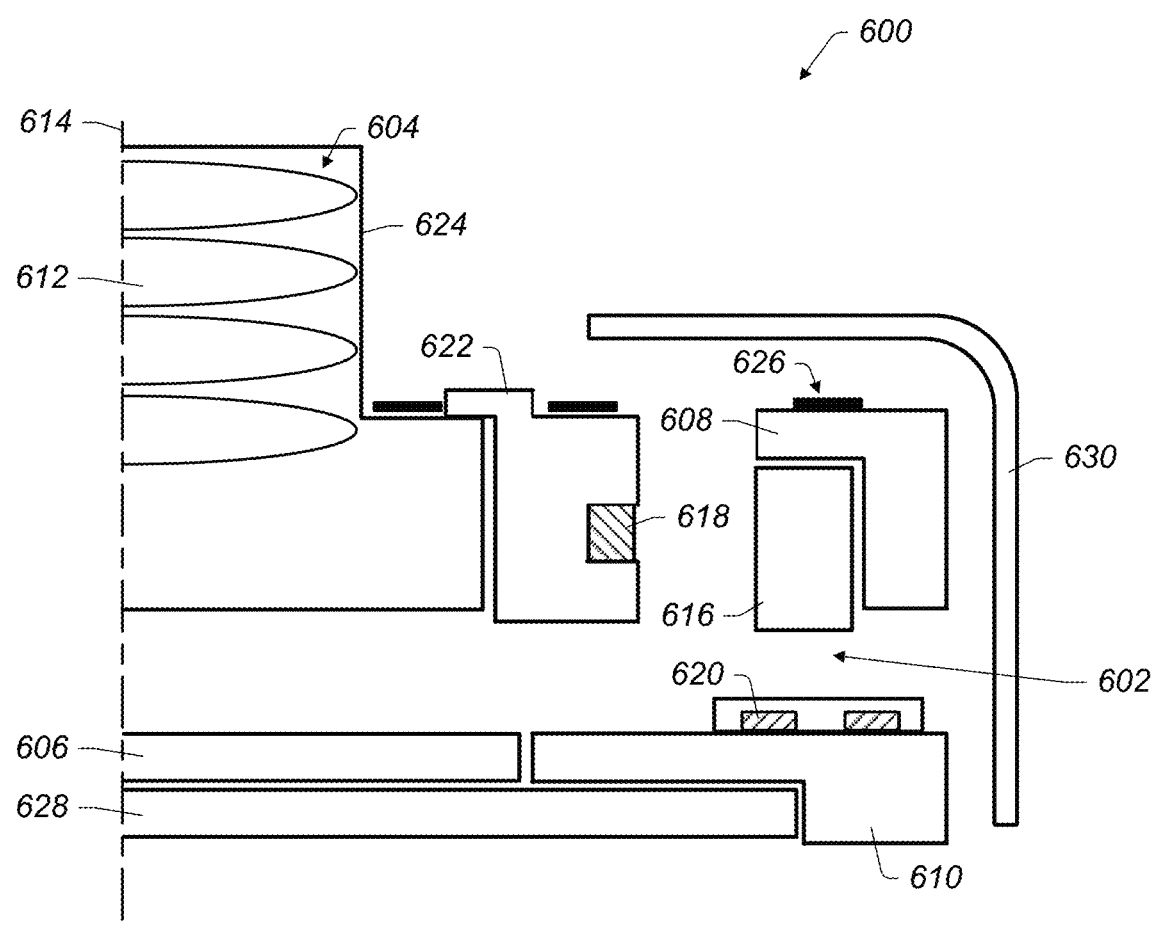
FIG. 6 illustrates a side cross-sectional view of an example camera module that includes an actuator that may be used to implement camera movement control for reduced power consumption, in accordance with some embodiments.

FIG. 6 illustrates a side cross-sectional view of an example camera module 600 that includes an actuator 602 that may be used to implement camera movement control for reduced power consumption. According to various embodiments, the camera module 600 may include a lens group 604, an image sensor 606, the actuator 602, a magnet holder 608, and/or a base structure 610. The lens group 604 may include one or more lens elements 612 that define an optical axis 614. The image sensor 606 may be configured to capture light that passes through the lens group 604.

In some embodiments, the actuator 602 may be configured to move the lens group 604 and/or the image sensor 606, e.g., causing relative movement between the lens group 604 and the image sensor 606 to provide autofocus (AF) and/or OIS functionality. For example, the actuator 602 may move the lens group 604 along the optical axis 614 to provide AF of an image on the image sensor 606. Additionally, or alternatively, the actuator 602 may move the lens group 604 in one or more directions orthogonal to the optical axis 614 to provide OIS of an image on the image sensor 606.

In some embodiments, the actuator 602 may comprise one or more voice coil motor (VCM) actuators. For example, the actuator 602 may include one or more magnets 616 and one or more coils (e.g., AF coil(s) 618 and/or OIS coil(s) 620). In some embodiments, the magnet(s) 616 may be attached to the magnet holder 608.

According to some non-limiting embodiments, the AF coil(s) 618 may be attached to a lens carrier 622 and/or a lens barrel 624. The lens carrier 622 may be coupled with the lens barrel 624 in some embodiments. In some embodiments, the lens barrel 624 may hold the lens element(s) 612 of the lens group 604. The AF coil(s) 618 may be disposed proximate the magnet(s) 616 such that the AF coil(s) 618 and the magnet(s) 616 magnetically interact when a current is provided to the AF coil(s) 618 In various embodiments, the magnetic interaction produces a Lorentz force that causes the lens group 604 (e.g., via the lens carrier 622 and/or the lens barrel 624) to move along the optical axis 614 to provide AF functionality.

According to some embodiments, the OIS coil(s) 620 may be coupled with the base structure 610. The OIS coil(s) 620 may be disposed proximate the magnet(s) 616 such that the OIS coil(s) 620 and the magnet(s) 616 magnetically interact when a current is provided to the OIS coil(s) 620. In various embodiments, the magnetic interaction produces a Lorentz force that causes the lens group 604 (e.g., via the magnet holder 608, the lens carrier 622, and/or the lens barrel 624) to move in one or more directions orthogonal to the optical axis 614 to provide OIS functionality.

In various examples, the camera 400 may include one or more suspension arrangements. For example, the camera 400 may include one or more leaf springs 626 in some embodiments. In some embodiments, the leaf spring(s) 626 may be used to suspend the lens carrier 622 from the magnet holder 608.

In some embodiments, the image sensor 606 may be coupled to the base structure 610. As a non-limiting example, the image sensor 606 may be attached to a substrate 628, and the substrate 628 may be attached to the base structure 610. In various embodiments, the image sensor 606, the substrate 628, and/or the base structure 610 may be stationary relative to movement of the lens group 604, the lens barrel 624, the lens carrier 626, and/or the magnet holder 608. Additionally, or alternatively, a stationary structure such as a shield can 630 may encase at least a portion of the camera 600.

Multifunction Device Examples

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, Calif. Other portable electronic devices, such as laptops, cameras, cell phones, or tablet computers, may also be used. It should also be understood that, in some embodiments, the device is not a portable communications device, but is a desktop computer with a camera. In some embodiments, the device is a gaming computer with orientation sensors (e.g., orientation sensors in a gaming controller). In other embodiments, the device is not a portable communications device, but is a camera.

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Figure 7:
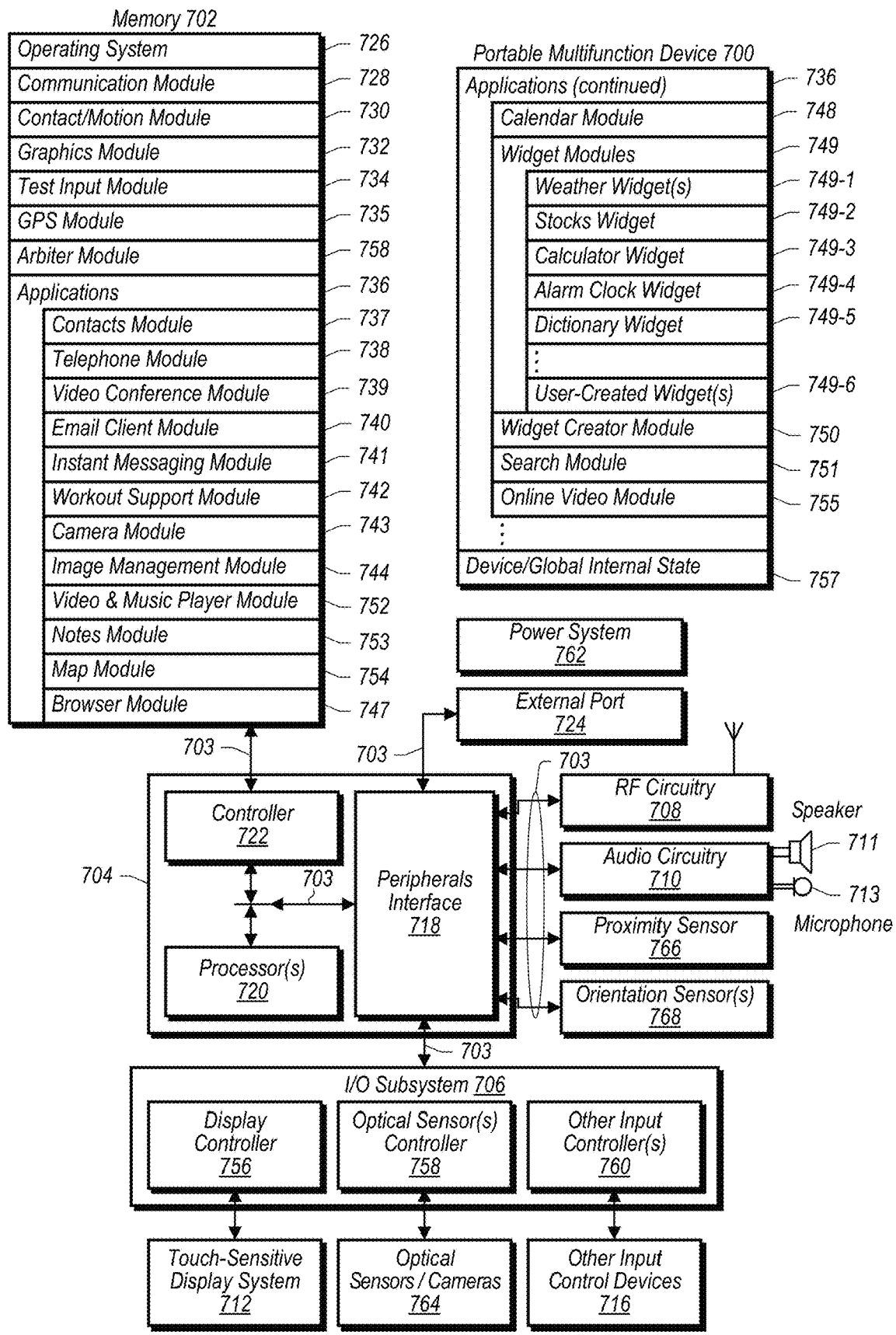
FIG. 7 illustrates a block diagram of a portable multifunction device that may include a camera module and that may implement camera movement control for reduced power consumption, in accordance with some embodiments.

Attention is now directed toward embodiments of portable devices with cameras. FIG. 7 illustrates a block diagram of an example portable multifunction device 700 that may include a camera module and that may implement camera movement control for reduced power consumption (e.g., as described above with reference to FIGS. 1-6), according to some embodiments. Cameras 764 are sometimes called "optical sensors" for convenience, and may also be known as or called an optical sensor system. Device 700 may include memory 702 (which may include one or more computer readable storage mediums), memory controller 722, one or more processing units (CPUs) 720, peripherals interface 718, RF circuitry 708, audio circuitry 710, speaker 711, touch-sensitive display system 712, microphone 713, input/output (I/O) subsystem 706, other input or control devices 716, and external port 724. Device 700 may include multiple optical sensors 764. These components may communicate over one or more communication buses or signal lines 703.

It should be appreciated that device 700 is only one example of a portable multifunction device, and that device 700 may have more or fewer components than shown, may combine two or more components, or may have a different configuration or arrangement of the components. The various components shown in FIG. 7 may be implemented in hardware, software, or a combination of hardware and software, including one or more signal processing and/or application specific integrated circuits.

Memory 702 may include high-speed random access memory and may also include non-volatile memory, such as one or more magnetic disk storage devices, flash memory devices, or other non-volatile solid-state memory devices. Access to memory 702 by other components of device 700, such as CPU 720 and the peripherals interface 718, may be controlled by memory controller 722.

Peripherals interface 718 can be used to couple input and output peripherals of the device to CPU 720 and memory 702. The one or more processors 720 run or execute various software programs and/or sets of instructions stored in memory 702 to perform various functions for device 700 and to process data.

In some embodiments, peripherals interface 718, CPU 720, and memory controller 722 may be implemented on a single chip, such as chip 704. In some other embodiments, they may be implemented on separate chips.

RF (radio frequency) circuitry 708 receives and sends RF signals, also called electromagnetic signals. RF circuitry 708 converts electrical signals to/from electromagnetic signals and communicates with communications networks and other communications devices via the electromagnetic signals. RF circuitry 708 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 708 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a variety of communications standards, protocols and technologies, including but not limited to Global System for Mobile Communications (GSM), Enhanced Data GSM Environment (EDGE), high-speed downlink packet access (HSDPA), high-speed uplink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 710, speaker 711, and microphone 713 provide an audio interface between a user and device 700. Audio circuitry 710 receives audio data from peripherals interface 718, converts the audio data to an electrical signal, and transmits the electrical signal to speaker 711. Speaker 711 converts the electrical signal to human-audible sound waves. Audio circuitry 710 also receives electrical signals converted by microphone 713 from sound waves. Audio circuitry 710 converts the electrical signal to audio data and transmits the audio data to peripherals interface 718 for processing. Audio data may be retrieved from and/or transmitted to memory 702 and/or RF circuitry 708 by peripherals interface 718. In some embodiments, audio circuitry 710 also includes a headset jack (e.g., 812, FIG. 8). The headset jack provides an interface between audio circuitry 710 and removable audio input/output peripherals, such as output-only headphones or a headset with both output (e.g., a headphone for one or both ears) and input (e.g., a microphone).

I/O subsystem 706 couples input/output peripherals on device 700, such as touch screen 712 and other input control devices 716, to peripherals interface 718. I/O subsystem 706 may include display controller 756 and one or more input controllers 760 for other input or control devices. The one or more input controllers 760 receive/send electrical signals from/to other input or control devices 716. The other input control devices 716 may include physical buttons (e.g., push buttons, rocker buttons, etc.), dials, slider switches, joysticks, click wheels, and so forth. In some alternate embodiments, input controller(s) 760 may be coupled to any (or none) of the following: a keyboard, infrared port, USB port, and a pointer device such as a mouse. The one or more buttons (e.g., 808, FIG. 8) may include an up/down button for volume control of speaker 711 and/or microphone 713. The one or more buttons may include a push button (e.g., 806, FIG. 8).

Touch-sensitive display 712 provides an input interface and an output interface between the device and a user. Display controller 756 receives and/or sends electrical signals from/to touch screen 712. Touch screen 712 displays visual output to the user. The visual output may include graphics, text, icons, video, and any combination thereof (collectively termed "graphics"). In some embodiments, some or all of the visual output may correspond to user-interface objects.

Touch screen 712 has a touch-sensitive surface, sensor or set of sensors that accepts input from the user based on haptic and/or tactile contact. Touch screen 712 and display controller 756 (along with any associated modules and/or sets of instructions in memory 702) detect contact (and any movement or breaking of the contact) on touch screen 712 and converts the detected contact into interaction with user-interface objects (e.g., one or more soft keys, icons, web pages or images) that are displayed on touch screen 712. In an example embodiment, a point of contact between touch screen 712 and the user corresponds to a finger of the user.

Touch screen 712 may use LCD (liquid crystal display) technology, LPD (light emitting polymer display) technology, or LED (light emitting diode) technology, although other display technologies may be used in other embodiments. Touch screen 712 and display controller 756 may detect contact and any movement or breaking thereof using any of a variety of touch sensing technologies now known or later developed, including but not limited to capacitive, resistive, infrared, and surface acoustic wave technologies, as well as other proximity sensor arrays or other elements for determining one or more points of contact with touch screen 712. In an example embodiment, projected mutual capacitance sensing technology is used, such as that found in the iPhone®, iPod Touch®, and iPad® from Apple Inc. of Cupertino, Calif.

Touch screen 712 may have a video resolution in excess of 800 dpi. In some embodiments, the touch screen has a video resolution of approximately 860 dpi. The user may make contact with touch screen 712 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 700 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 712 or an extension of the touch-sensitive surface formed by the touch screen.

Device 700 also includes power system 762 for powering the various components. Power system 762 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 700 may also include one or more optical sensors or cameras 764. FIG. 7 shows an optical sensor 764 coupled to optical sensor controller 758 in I/O subsystem 706. Optical sensor 764 may include charge-coupled device (CCD) or complementary metal-oxide semiconductor (CMOS) phototransistors. Optical sensor 764 receives light from the environment, projected through one or more lens, and converts the light to data representing an image. In conjunction with imaging module 743 (also called a camera module), optical sensor 764 may capture still images or video. In some embodiments, an optical sensor 764 is located on the back of device 700, opposite touch screen display 712 on the front of the device, so that the touch screen display 712 may be used as a viewfinder for still and/or video image acquisition. In some embodiments, another optical sensor is located on the front of the device so that the user's image may be obtained for videoconferencing while the user views the other video conference participants on the touch screen display.

Device 700 may also include one or more proximity sensors 766. FIG. 7 shows proximity sensor 766 coupled to peripherals interface 718. Alternately, proximity sensor 766 may be coupled to input controller 760 in I/O subsystem 706. In some embodiments, the proximity sensor 766 turns off and disables touch screen 712 when the multifunction device 700 is placed near the user's ear (e.g., when the user is making a phone call).

Device 700 includes one or more orientation sensors 768. In some embodiments, the one or more orientation sensors 768 include one or more accelerometers (e.g., one or more linear accelerometers and/or one or more rotational accelerometers). In some embodiments, the one or more orientation sensors 768 include one or more gyroscopes. In some embodiments, the one or more orientation sensors 768 include one or more magnetometers. In some embodiments, the one or more orientation sensors 768 include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 700. In some embodiments, the one or more orientation sensors 768 include any combination of orientation/rotation sensors. FIG. 7 shows the one or more orientation sensors 768 coupled to peripherals interface 718. Alternately, the one or more orientation sensors 768 may be coupled to an input controller 760 in I/O subsystem 706. In some embodiments, information is displayed on the touch screen display 712 in a portrait view or a landscape view based on an analysis of data received from the one or more orientation sensors 768.

In some embodiments, the software components stored in memory 702 include operating system 726, communication module (or set of instructions) 728, contact/motion module (or set of instructions) 730, graphics module (or set of instructions) 732, text input module (or set of instructions) 734, Global Positioning System (GPS) module (or set of instructions) 735, arbiter module 758 and applications (or sets of instructions) 736. Furthermore, in some embodiments memory 702 stores device/global internal state 757. Device/global internal state 757 includes one or more of: active application state, indicating which applications, if any, are currently active; display state, indicating what applications, views or other information occupy various regions of touch screen display 712; sensor state, including information obtained from the device's various sensors and input control devices 716; and location information concerning the device's location and/or attitude.

Operating system 726 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 728 facilitates communication with other devices over one or more external ports 724 and also includes various software components for handling data received by RF circuitry 708 and/or external port 724. External port 724 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector.

Contact/motion module 730 may detect contact with touch screen 712 (in conjunction with display controller 756) and other touch sensitive devices (e.g., a touchpad or physical click wheel). Contact/motion module 730 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 730 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 730 and display controller 756 detect contact on a touchpad.

Contact/motion module 730 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 732 includes various known software components for rendering and displaying graphics on touch screen 712 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 732 stores data representing graphics to be used. Each graphic may be assigned a corresponding code. Graphics module 732 receives, from applications etc., one or more codes specifying graphics to be displayed along with, if necessary, coordinate data and other graphic property data, and then generates screen image data to output to display controller 756.

Text input module 734, which may be a component of graphics module 732, provides soft keyboards for entering text in various applications (e.g., contacts 737, e-mail 740, IM 741, browser 747, and any other application that needs text input).

GPS module 735 determines the location of the device and provides this information for use in various applications (e.g., to telephone 738 for use in location-based dialing, to camera 743 as picture/video metadata, and to applications that provide location-based services such as weather widgets, local yellow page widgets, and map/navigation widgets).

Applications 736 may include the following modules (or sets of instructions), or a subset or superset thereof:
contacts module 737 (sometimes called an address book or contact list);
telephone module 738;
video conferencing module 739;
e-mail client module 740;
instant messaging (IM) module 741;
workout support module 742;
camera module 743 for still and/or video images;
image management module 744;
browser module 747;
calendar module 748;
widget modules 749, which may include one or more of:
weather widget 749-1, stocks widget 749-2, calculator widget 749-3, alarm clock widget 749-4, dictionary widget 749-5, and other widgets obtained by the user, as well as user-created widgets 749-6;
widget creator module 750 for making user-created widgets 749-6;
search module 751;
video and music player module 752, which may be made up of a video player module and a music player module;
notes module 753;
map module 754; and/or
online video module 755.

Examples of other applications 736 that may be stored in memory 702 include other word processing applications, other image editing applications, drawing applications, presentation applications, JAVA-enabled applications, encryption, digital rights management, voice recognition, and voice replication.

In conjunction with touch screen 712, display controller 756, contact module 730, graphics module 732, and text input module 734, contacts module 737 may be used to manage an address book or contact list (e.g., stored in application internal state 757), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 738, video conference 739, e-mail 740, or IM 741; and so forth.

In conjunction with RF circuitry 708, audio circuitry 710, speaker 711, microphone 713, touch screen 712, display controller 756, contact module 730, graphics module 732, and text input module 734, telephone module 738 may be used to enter a sequence of characters corresponding to a telephone number, access one or more telephone numbers in address book 737, modify a telephone number that has been entered, dial a respective telephone number, conduct a conversation and disconnect or hang up when the conversation is completed. As noted above, the wireless communication may use any of a variety of communications standards, protocols and technologies.

In conjunction with RF circuitry 708, audio circuitry 710, speaker 711, microphone 713, touch screen 712, display controller 756, optical sensor 764, optical sensor controller 758, contact module 730, graphics module 732, text input module 734, contact list 737, and telephone module 738, videoconferencing module 739 includes executable instructions to initiate, conduct, and terminate a video conference between a user and one or more other participants in accordance with user instructions.

In conjunction with RF circuitry 708, touch screen 712, display controller 756, contact module 730, graphics module 732, and text input module 734, e-mail client module 740 includes executable instructions to create, send, receive, and manage e-mail in response to user instructions. In conjunction with image management module 744, e-mail client module 740 makes it very easy to create and send e-mails with still or video images taken with camera module 743.

In conjunction with RF circuitry 708, touch screen 712, display controller 756, contact module 730, graphics module 732, and text input module 734, the instant messaging module 741 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 708, touch screen 712, display controller 756, contact module 730, graphics module 732, text input module 734, GPS module 735, map module 754, and music player module 746, workout support module 742 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 712, display controller 756, optical sensor(s) 764, optical sensor controller 758, contact module 730, graphics module 732, and image management module 744, camera module 743 includes executable instructions to capture still images or video (including a video stream) and store them into memory 702, modify characteristics of a still image or video, or delete a still image or video from memory 702.

In conjunction with touch screen 712, display controller 756, contact module 730, graphics module 732, text input module 734, and camera module 743, image management module 744 includes executable instructions to arrange, modify (e.g., edit), or otherwise manipulate, label, delete, present (e.g., in a digital slide show or album), and store still and/or video images.

In conjunction with RF circuitry 708, touch screen 712, display system controller 756, contact module 730, graphics module 732, and text input module 734, browser module 747 includes executable instructions to browse the Internet in accordance with user instructions, including searching, linking to, receiving, and displaying web pages or portions thereof, as well as attachments and other files linked to web pages.

In conjunction with RF circuitry 708, touch screen 712, display system controller 756, contact module 730, graphics module 732, text input module 734, e-mail client module 740, and browser module 747, calendar module 748 includes executable instructions to create, display, modify, and store calendars and data associated with calendars (e.g., calendar entries, to do lists, etc.) in accordance with user instructions.

In conjunction with RF circuitry 708, touch screen 712, display system controller 756, contact module 730, graphics module 732, text input module 734, and browser module 747, widget modules 749 are mini-applications that may be downloaded and used by a user (e.g., weather widget 749-1, stocks widget 749-2, calculator widget 749-3, alarm clock widget 749-4, and dictionary widget 749-5) or created by the user (e.g., user-created widget 749-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 708, touch screen 712, display system controller 756, contact module 730, graphics module 732, text input module 734, and browser module 747, the widget creator module 750 may be used by a user to create widgets (e.g., turning a user-specified portion of a web page into a widget).

In conjunction with touch screen 712, display system controller 756, contact module 730, graphics module 732, and text input module 734, search module 751 includes executable instructions to search for text, music, sound, image, video, and/or other files in memory 702 that match one or more search criteria (e.g., one or more user-specified search terms) in accordance with user instructions.

In conjunction with touch screen 712, display system controller 756, contact module 730, graphics module 732, audio circuitry 710, speaker 711, RF circuitry 708, and browser module 747, video and music player module 752 includes executable instructions that allow the user to download and play back recorded music and other sound files stored in one or more file formats, such as MP3 or AAC files, and executable instructions to display, present or otherwise play back videos (e.g., on touch screen 712 or on an external, connected display via external port 724). In some embodiments, device 700 may include the functionality of an MP3 player.

In conjunction with touch screen 712, display controller 756, contact module 730, graphics module 732, and text input module 734, notes module 753 includes executable instructions to create and manage notes, to do lists, and the like in accordance with user instructions.

In conjunction with RF circuitry 708, touch screen 712, display system controller 756, contact module 730, graphics module 732, text input module 734, GPS module 735, and browser module 747, map module 754 may be used to receive, display, modify, and store maps and data associated with maps (e.g., driving directions; data on stores and other points of interest at or near a particular location; and other location-based data) in accordance with user instructions.

In conjunction with touch screen 712, display system controller 756, contact module 730, graphics module 732, audio circuitry 710, speaker 711, RF circuitry 708, text input module 734, e-mail client module 740, and browser module 747, online video module 755 includes instructions that allow the user to access, browse, receive (e.g., by streaming and/or download), play back (e.g., on the touch screen or on an external, connected display via external port 724), send an e-mail with a link to a particular online video, and otherwise manage online videos in one or more file formats, such as H.264. In some embodiments, instant messaging module 741, rather than e-mail client module 740, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 702 may store a subset of the modules and data structures identified above. Furthermore, memory 702 may store additional modules and data structures not described above.

In some embodiments, device 700 is a device where operation of a predefined set of functions on the device is performed exclusively through a touch screen and/or a touchpad. By using a touch screen and/or a touchpad as the primary input control device for operation of device 700, the number of physical input control devices (such as push buttons, dials, and the like) on device 700 may be reduced.

The predefined set of functions that may be performed exclusively through a touch screen and/or a touchpad include navigation between user interfaces. In some embodiments, the touchpad, when touched by the user, navigates device 700 to a main, home, or root menu from any user interface that may be displayed on device 700. In such embodiments, the touchpad may be referred to as a "menu button." In some other embodiments, the menu button may be a physical push button or other physical input control device instead of a touchpad.

Figure 8:
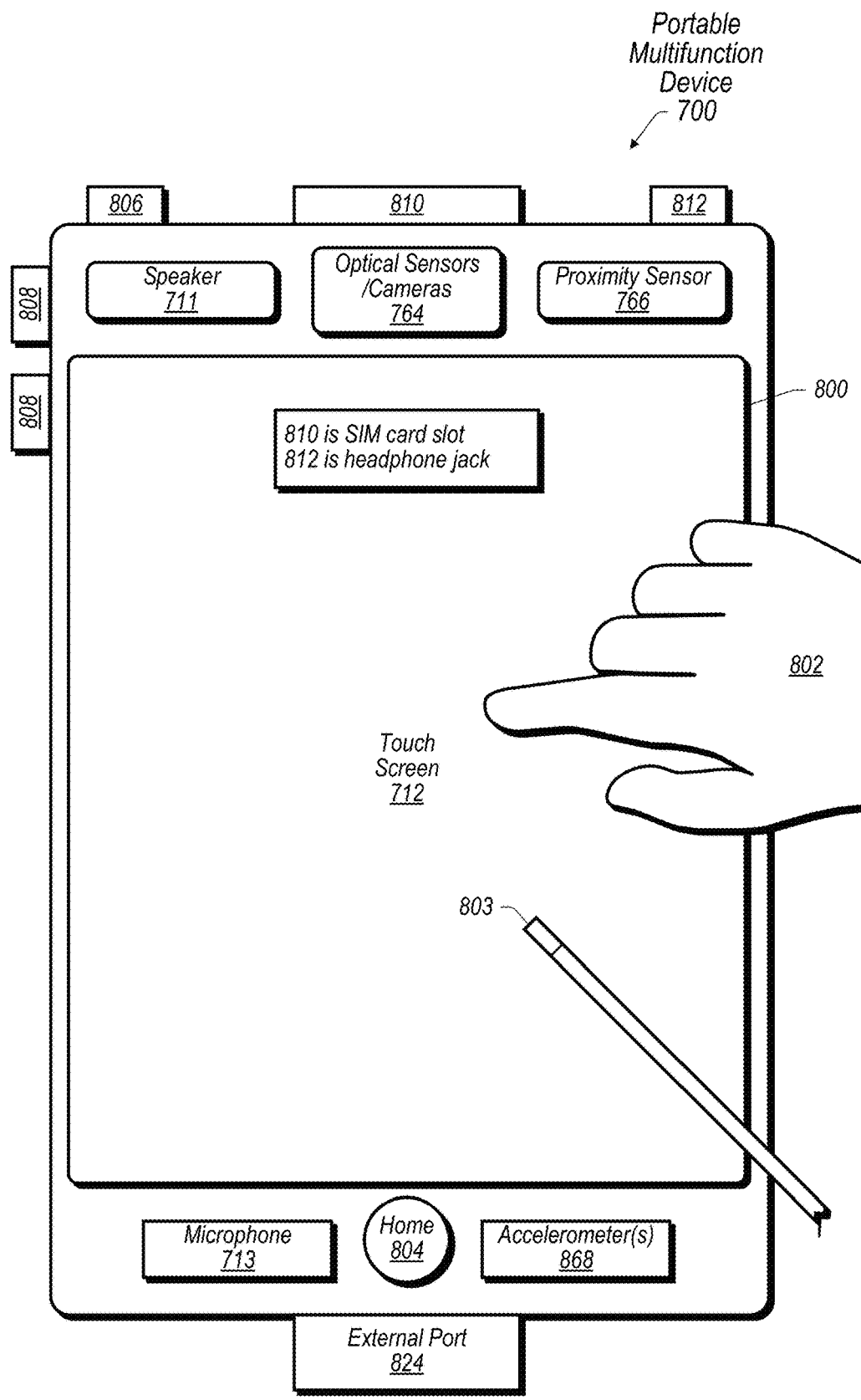
FIG. 8 illustrates a portable multifunction device that may include a camera module and that may implement camera movement control for reduced power consumption, in accordance with some embodiments.

FIG. 8 depicts illustrates an example portable multifunction device 700 that may include a camera module and that may implement camera movement control for reduced power consumption (e.g., as described above with reference to FIGS. 1-6), according to some embodiments. The device 700 may have a touch screen 712. The touch screen 712 may display one or more graphics within user interface (UI) 800. In this embodiment, as well as others described below, a user may select one or more of the graphics by making a gesture on the graphics, for example, with one or more fingers 802 (not intended to be drawn to scale in the figure) or one or more styluses 803 (not intended to be drawn to scale in the figure).

Device 700 may also include one or more physical buttons, such as "home" or menu button 804. As described previously, menu button 804 may be used to navigate to any application 736 in a set of applications that may be executed on device 700. Alternatively, in some embodiments, the menu button 804 is implemented as a soft key in a GUI displayed on touch screen 712.

In one embodiment, device 700 includes touch screen 712, menu button 804, push button 806 for powering the device on/off and locking the device, volume adjustment button(s) 808, Subscriber Identity Module (SIM) card slot 810, head set jack 812, and docking/charging external port 824. Push button 806 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 700 also may accept verbal input for activation or deactivation of some functions through microphone 713.

It should be noted that, although many of the examples herein are given with reference to optical sensor(s)/camera(s) 764 (on the front of a device), one or more rear-facing cameras or optical sensors that are pointed opposite from the display may be used instead of, or in addition to, an optical sensor(s)/camera(s) 764 on the front of a device.

Example Computer System

Figure 9:
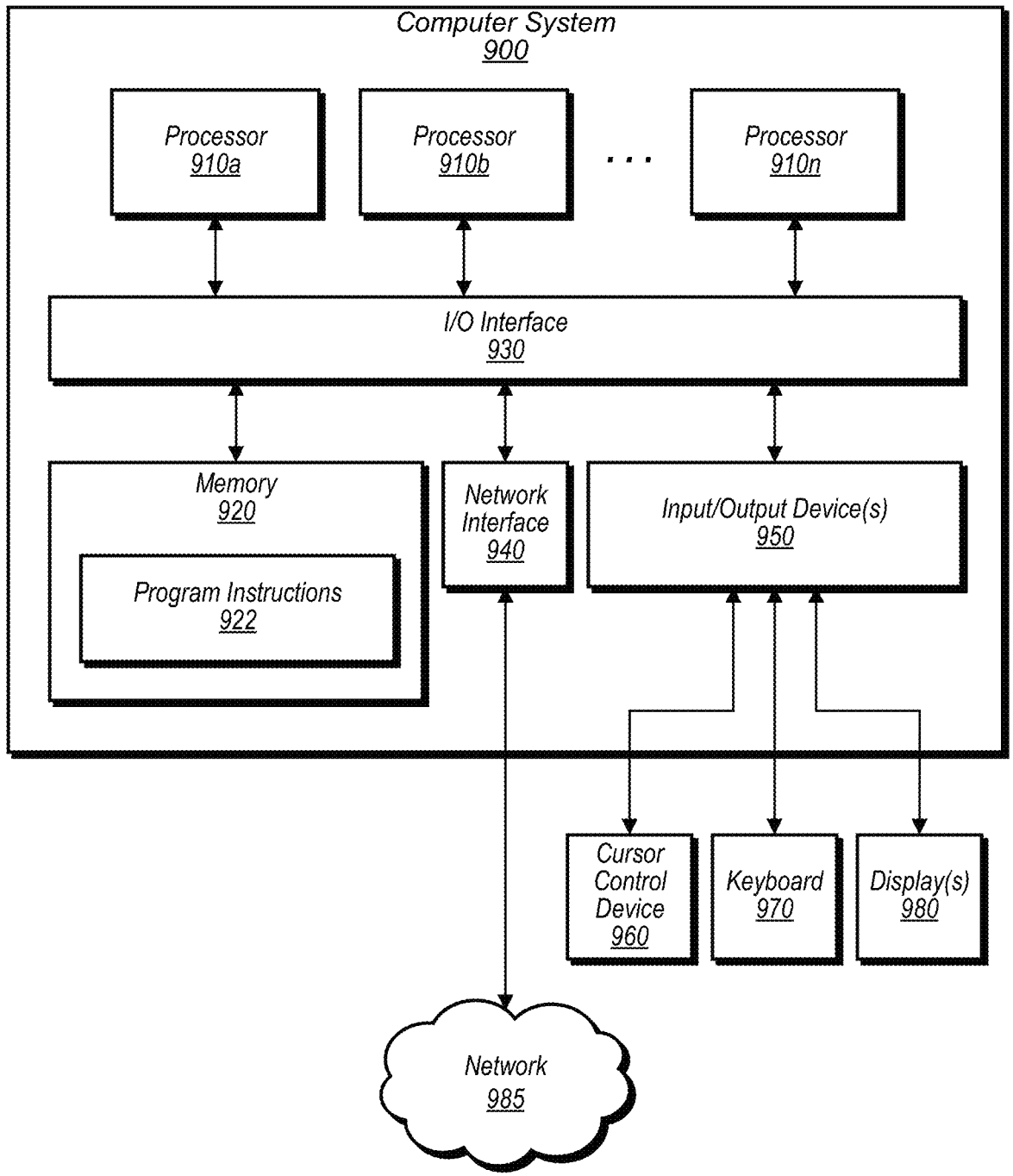
FIG. 9 illustrates an example computer system that may include a camera module and that may implement camera movement control for reduced power consumption, in accordance with some embodiments.

FIG. 9 illustrates an example computer system 900 that may include a camera module and that may implement camera movement control for reduced power consumption (e.g., as described above with reference to FIGS. 1-6), according to some embodiments. The computer system 900 may be configured to execute any or all of the embodiments described above. In different embodiments, computer system 900 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a camera motion control system as described herein, including embodiments of magnetic position sensing, as described herein may be executed in one or more computer systems 900, which may interact with various other devices. Note that any component, action, or functionality described above with respect to FIGS. 1-8 may be implemented on one or more computers configured as computer system 900 of FIG. 9, according to various embodiments. In the illustrated embodiment, computer system 900 includes one or more processors 910 coupled to a system memory 920 via an input/output (I/O) interface 930. Computer system 900 further includes a network interface 940 coupled to I/O interface 930, and one or more input/output devices 950, such as cursor control device 960, keyboard 970, and display(s) 980. In some cases, it is contemplated that embodiments may be implemented using a single instance of computer system 900, while in other embodiments multiple such systems, or multiple nodes making up computer system 900, may be configured to host different portions or instances of embodiments. For example, in one embodiment some elements may be implemented via one or more nodes of computer system 900 that are distinct from those nodes implementing other elements.

In various embodiments, computer system 900 may be a uniprocessor system including one processor 910, or a multiprocessor system including several processors 910 (e.g., two, four, eight, or another suitable number). Processors 910 may be any suitable processor capable of executing instructions. For example, in various embodiments processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store camera control program instructions 922 and/or camera control data accessible by processor 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions 922 may be configured to implement a lens control application 924 incorporating any of the functionality described above. Additionally, existing camera control data 932 of memory 920 may include any of the information or data structures described above. In some embodiments, program instructions and/or data may be received, sent or stored upon different types of computer-accessible media or on similar media separate from system memory 920 or computer system 900. While computer system 900 is described as implementing the functionality of functional blocks of previous Figures, any of the functionality described herein may be implemented via such a computer system.

In one embodiment, I/O interface 930 may be configured to coordinate I/O traffic between processor 910, system memory 920, and any peripheral devices in the device, including network interface 940 or other peripheral interfaces, such as input/output devices 950. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices attached to a network 985 (e.g., carrier or agent devices) or between nodes of computer system 900. Network 985 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 940 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 950 may, in some embodiments, include one or more display terminals, keyboards, keypads, touchpads, scanning devices, voice or optical recognition devices, or any other devices suitable for entering or accessing data by one or more computer systems 900. Multiple input/output devices 950 may be present in computer system 900 or may be distributed on various nodes of computer system 900. In some embodiments, similar input/output devices may be separate from computer system 900 and may interact with one or more nodes of computer system 900 through a wired or wireless connection, such as over network interface 940.

As shown in FIG. 9, memory 920 may include program instructions 922, which may be processor-executable to implement any element or action described above. In one embodiment, the program instructions may implement the methods described above. In other embodiments, different elements and data may be included. Note that data may include any data or information described above.

Those skilled in the art will appreciate that computer system 900 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations.

Additional descriptions of embodiments (example clauses):

Clause 1: A device, comprising: a camera module, comprising: a lens group comprising one or more lenses; an image sensor to capture light that has passed through the lens group; and an actuator to move at least one of the lens group or the image sensor in at least a direction parallel to an optical axis of the camera module to provide focus movement for images captured via the camera module; and one or more processors to operate the camera module in a power saving mode, wherein the one or more processors are to: control, during one or more time periods in which the image sensor is being exposed for image capture, the actuator in accordance with one or more position maintenance drive signals to hold the at least one of the lens group or the image sensor such that the lens group and the image sensor do not move relative to each other in the direction parallel to the optical axis; control, during one or more time periods in which the image sensor is not being exposed for image capture, the actuator in accordance with one or more power saving drive signals to enable movement of the at least one of the lens group or the image sensor between a last-held position and a neutral position; wherein the control of the actuator in accordance with the one or more power saving drive signals consumes less power than the control of the actuator in accordance with the one or more position maintenance drive signals.

Clause 2: The device of Clause 1, the one or more processors control the actuator in accordance with the one or more position maintenance drive signals during a first frame capture time period in which a first image frame is captured, wherein the one or more time periods in which the image sensor is being exposed comprise the first frame capture time period; the one or more processors control the actuator in accordance with the one or more power saving drive signals during a blanking interval between the first frame capture time period and a second frame capture time period in which a second image frame is captured, wherein the one or more time periods in which the image sensor is not being exposed comprise the blanking interval; and the first image frame and the second image frame are consecutively captured.

Clause 3: The device of Clause 2, wherein: based at least in part on a determination that the second image frame is non-expendable, the one or more processors control the actuator in accordance with the one or more position maintenance drive signals during the second frame capture time period; based at least in part on a determination that a third frame is expendable, the one or more processors control the actuator in accordance with the one or more power saving drive signals during: (i) another blanking interval between the second frame capture time period and a third frame capture time period in which the third frame is captured, and (ii) the third frame capture time period; and the second image frame and the third image frame are consecutively captured.

Clause 4: The device of any of Clauses 1-3, wherein the one or more processors are further to: operate the camera module in one or more other modes different from the power saving mode, wherein, to operate the camera module in at least one of the one or more other modes, the one or more processors are to: control the actuator in accordance with one or more drive signals to hold the lens group and the image sensor such that the lens group and the image sensor do not move relative to each other in the direction parallel to the optical axis, throughout (i) a first frame capture time period in which a first image frame is captured and (ii) a blanking interval between the first frame capture time period and a second frame capture time period in which a second image frame is captured, wherein the first image frame and the second image frame are consecutively captured; wherein the one or more processors switch from operating the camera module in the at least one of the one or more other modes to operating the camera module in the power saving mode in response to a determination to initiate the power saving mode.

Clause 5: The device of Clause 4, further comprising: a display; wherein the one or more processors are further to: determine to initiate the power saving mode based at least in part on a determination that a control associated with the power saving mode has been selected via a user interface presented on the display.

Clause 6: The device of any of Clauses 1-5, wherein: the actuator is configured to move the at least one of the lens group or the image sensor in at least the optical axis to provide autofocus (AF) for the images captured via the camera module; and the actuator is further configured to move at least one of the lens group or the image sensor in one or more directions orthogonal to the optical axis to provide optical image stabilization (OIS) movement for the images captured via the camera module.

Clause 7: The device of Clause 6, wherein: to operate the camera module in the power saving mode, the one or more processors are further to: control, during at least a portion of the one or more time periods in which the image sensor is being exposed, the actuator in accordance with one or more OIS drive signals to move the at least one of the lens group or the image sensor in the one or more directions orthogonal to the optical axis; and the neutral position is a position at which the at least one of the lens group or the image sensor settles in a resting state when no current is provided to the actuator.

Clause 8: The device of any of Clauses 1-7, wherein: the one or more time periods in which the image sensor is not being exposed for image capture comprises: a first time period between a first pair of consecutive image sensor exposure times; and a second time period between a second pair of consecutive image sensor exposure times, the second time period being longer than the first time period; and based at least in part on the second time period being longer than the first time period, the one or more processors control the actuator in accordance with the one or more power saving drive signals so as to position the at least one of the lens group or the image sensor closer to the neutral position during the second time period than during the first time period.

Clause 9: A system, comprising: a camera module, comprising: a lens group comprising one or more lenses; an image sensor to capture light that has passed through the lens group; and an actuator to move at least one of the lens group or the image sensor in at least a direction parallel to an optical axis of the camera module to provide focus movement for images captured via the camera module; and a controller to: operate the camera module in a power saving mode, wherein the controller is to: control, during one or more time periods in which the image sensor is being exposed for image capture, the actuator in accordance with one or more position maintenance drive signals to hold the at least one of a lens group or the image sensor at a focus position; and control, during one or more time periods in which the image sensor is not being exposed for image capture, the actuator in accordance with one or more power saving drive signals to enable movement of the at least one of the lens group or the image sensor between the focus position and a neutral position; wherein the control of the actuator in accordance with the one or more power saving drive signals consumes less power than the control of the actuator in accordance with the one or more position maintenance drive signals.

Clause 10: The system of Clause 9, wherein: the controller controls the actuator in accordance with the one or more position maintenance drive signals during a first frame capture time period in which a first image frame is captured, wherein the one or more time periods in which the image sensor is being exposed comprise the first frame capture time period; the controller controls the actuator in accordance with the one or more power saving drive signals during a blanking interval between the first frame capture time period and a second frame capture time period in which a second image frame is captured, wherein the one or more time periods in which the image sensor is not being exposed comprise the blanking interval; and the first image frame and the second image frame are consecutively captured.

Clause 11: The system of Clause 10, wherein: the controller controls the actuator in accordance with the one or more position maintenance drive signals during the second frame capture time period; the controller controls the actuator in accordance with the one or more power saving drive signals during another blanking interval between the second frame capture time period and a third frame capture time period in which a third image frame is captured; and the second image frame and the third image frame are consecutively captured.

Clause 12: The system of any of Clauses 9-11, wherein the controller is further to: operate the camera module in one or more other modes different from the power saving mode, wherein, to operate the camera module in at least one of the one or more other modes, the controller is to: control the actuator in accordance with one or more drive signals to hold the at least one of the lens group or the image sensor such that the lens group and the image sensor do not move relative to each other in the direction parallel to the optical axis, throughout (i) a first frame capture time period in which a first image frame is captured and (ii) a blanking interval between the first frame capture time period and a second frame capture time period in which a second image frame is captured, wherein the first image frame and the second image frame are consecutively captured; wherein the controller switches from operating the camera module in the at least one of the one or more other modes to operating the camera module in the power saving mode in response to a determination to initiate the power saving mode.

Clause 13: The system of any of Clauses 9-12, wherein: the actuator comprises a voice coil motor (VCM) actuator that includes one or more magnets and one or more coils; to control the actuator in accordance with the one or more position maintenance drive signals, the controller determines one or more position maintenance drive currents to provide to at least one coil of the one or more coils such that the VCM actuator holds the at least one of the lens group or the image sensor at the focus position; to control the actuator in accordance with the one or more power saving signals, the controller determines one or more power saving drive currents to provide to the at least one coil to enable movement of the at least one of the lens group or the image sensor between the focus position and the neutral position; and the one or more power saving drive currents are lower, on average, than the one or more position maintenance drive currents.

Clause 14: The system of Clause 13, wherein: the one or more time periods in which the image sensor is not being exposed for image capture comprises a blanking interval in between consecutive image sensor exposure intervals; and to control the actuator in accordance with the one or more power saving drive signals, the controller is to: determine a first time period for a step-down of current provided to the at least one coil, the step-down being from a position maintenance drive current of the one or more position maintenance drive currents to a power saving drive current of the one or more power saving drive currents; and determine a second time period for a step-up of current provided to the at least one coil, the step-up being from the power saving drive current to the position maintenance drive current; wherein the first time period and the second time period are different subsets of the blanking interval.

Clause 15: The system of any of Clauses 9-14, wherein: the one or more time periods in which the image sensor is not being exposed comprise a first time period and a second time period; and the controller is further to: determine, based at least in part on a first duration of the first time period, a first power saving drive signal of the one or more power saving drive signals, wherein the first power saving drive signal is associated with a first drive current provided to the actuator during the first time period; and determine, based at least in part on a second duration of the second time period, a second power saving drive signal of the one or more power saving drive signals, wherein the second power saving drive signal is associated with a second drive current provided to the actuator during the second time period, and wherein the second drive current is different than the first drive current based on the second duration being different than the first duration.

Clause 16: The system of Clause 15, wherein the first drive current or the second drive current is zero.

Clause 17: The system of any of Clauses 9-16, wherein: the actuator is configured to move the lens group to provide autofocus (AF) for images captured via the camera module; and the actuator is configured to move the lens group or the image sensor to provide optical image stabilization (OIS) movement for the images captured via the camera module.

Clause 18: A method, comprising: implementing a power saving mode of a camera module, wherein the implementing the power saving mode comprises: maintaining, via an actuator of the camera module and during one or more time periods in which an image sensor of the camera module is being exposed for image capture, at least one of a lens group or an image sensor at a focus position, wherein: the lens group comprises one or more lenses; and the image sensor is to capture light that has passed through the lens group; and moving, during one or more time periods in which the image sensor is not being exposed for image capture, the at least one of the lens group or the image sensor, between the focus position and a neutral position; wherein the moving the at least one of the lens group or the image sensor between the focus position and the neutral position consumes less power than the maintaining the at least one of the lens group or the image sensor at the focus position.

Clause 19: The method of Clause 18, wherein the neutral position is a position at which the lens group or the image sensor settles in a resting state when no current is provided to the actuator.

Clause 20: The method of any of Clauses 18 or 19, further comprising: implementing one or more other modes different from the power saving mode, wherein implementing at least one of the one or more other modes comprises: holding the at least one of the lens group or the image sensor such that the lens group and the image sensor do not move relative to each other in a focus movement direction that is parallel to an optical axis of the camera module, throughout (i) a first frame capture time period in which a first image frame is captured and (ii) a blanking interval between the first frame capture time period and a second frame capture time period in which a second image frame is captured, wherein the first image frame and the second image frame are consecutively captured.

Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A device, comprising:
   a camera module, comprising:
     a lens group comprising one or more lenses;
     an image sensor to capture light that has passed through the lens group; and
     an actuator to move at least one of the lens group or the image sensor in at least a direction parallel to an optical axis of the camera module to provide focus movement for images captured via the camera module; and
   one or more processors to
     operate the camera module in a power saving mode, wherein the one or more processors are to:
       control, during one or more time periods in which the image sensor is being exposed for image capture, the actuator in accordance with one or more position maintenance drive signals to hold the at least one of the lens group or the image sensor such that the lens group and the image sensor do not move relative to each other in the direction parallel to the optical axis;
       control, during one or more time periods in which the image sensor is not being exposed for image capture, the actuator in accordance with one or more power saving drive signals to enable movement of the at least one of the lens group or the image sensor between a last-held position and a neutral position;
       wherein the control of the actuator in accordance with the one or more power saving drive signals consumes less power than the control of the actuator in accordance with the one or more position maintenance drive signals.

2. The device of claim 1, wherein:
   the one or more processors control the actuator in accordance with the one or more position maintenance drive signals during a first frame capture time period in which a first image frame is captured, wherein the one or more time periods in which the image sensor is being exposed comprise the first frame capture time period;

the one or more processors control the actuator in accordance with the one or more power saving drive signals during a blanking interval between the first frame capture time period and a second frame capture time period in which a second image frame is captured, wherein the one or more time periods in which the image sensor is not being exposed comprise the blanking interval; and the first image frame and the second image frame are consecutively captured.

3. The device of claim 2, wherein:

based at least in part on a determination that the second image frame is non-expendable, the one or more processors control the actuator in accordance with the one or more position maintenance drive signals during the second frame capture time period;

based at least in part on a determination that a third frame is expendable, the one or more processors control the actuator in accordance with the one or more power saving drive signals during: (i) another blanking interval between the second frame capture time period and a third frame capture time period in which the third frame is captured, and (ii) the third frame capture time period; and the second image frame and the third image frame are consecutively captured.

4. The device of claim 1, wherein the one or more processors are further to:

operate the camera module in one or more other modes different from the power saving mode, wherein, to operate the camera module in at least one of the one or more other modes, the one or more processors are to:
control the actuator in accordance with one or more drive signals to hold the lens group and the image sensor such that the lens group and the image sensor do not move relative to each other in the direction parallel to the optical axis, throughout (i) a first frame capture time period in which a first image frame is captured and (ii) a blanking interval between the first frame capture time period and a second frame capture time period in which a second image frame is captured, wherein the first image frame and the second image frame are consecutively captured;

wherein the one or more processors switch from operating the camera module in the at least one of the one or more other modes to operating the camera module in the power saving mode in response to a determination to initiate the power saving mode.

5. The device of claim 4, further comprising:

a display;

wherein the one or more processors are further to:
determine to initiate the power saving mode based at least in part on a determination that a control associated with the power saving mode has been selected via a user interface presented on the display.

6. The device of claim 1, wherein:

the actuator is configured to move the at least one of the lens group or the image sensor in at least the optical axis to provide autofocus (AF) for the images captured via the camera module; and the actuator is further configured to move at least one of the lens group or the image sensor in one or more directions orthogonal to the optical axis to provide optical image stabilization (OIS) movement for the images captured via the camera module.

7. The device of claim 6, wherein:

to operate the camera module in the power saving mode, the one or more processors are further to:
control, during at least a portion of the one or more time periods in which the image sensor is being exposed, the actuator in accordance with one or more OIS drive signals to move the at least one of the lens group or the image sensor in the one or more directions orthogonal to the optical axis; and the neutral position is at least one of a zero-power location or a position at which the at least one of the lens group or the image sensor settles in a resting state when no current is provided to the actuator.

8. The device of claim 1, wherein:

the one or more time periods in which the image sensor is not being exposed for image capture comprises:
a first time period between a first pair of consecutive image sensor exposure times; and
a second time period between a second pair of consecutive image sensor exposure times, the second time period being longer than the first time period; and based at least in part on the second time period being longer than the first time period, the one or more processors control the actuator in accordance with the one or more power saving drive signals so as to position the at least one of the lens group or the image sensor closer to the neutral position during the second time period than during the first time period.

9. A system, comprising:

a camera module, comprising:
a lens group comprising one or more lenses;
an image sensor to capture light that has passed through the lens group; and
an actuator to move at least one of the lens group or the image sensor in at least a direction parallel to an optical axis of the camera module to provide focus movement for images captured via the camera module; and a controller to:
operate the camera module in a power saving mode, wherein the controller is to:
control, during one or more time periods in which the image sensor is being exposed for image capture, the actuator in accordance with one or more position maintenance drive signals to hold the at least one of a lens group or the image sensor at a focus position; and
control, during one or more time periods in which the image sensor is not being exposed for image capture, the actuator in accordance with one or more power saving drive signals to enable movement of the at least one of the lens group or the image sensor between the focus position and a neutral position;
wherein the control of the actuator in accordance with the one or more power saving drive signals consumes less power than the control of the actuator in accordance with the one or more position maintenance drive signals.

10. The system of claim 9, wherein:

the controller controls the actuator in accordance with the one or more position maintenance drive signals during a first frame capture time period in which a first image frame is captured, wherein the one or more time periods in which the image sensor is being exposed comprise the first frame capture time period;
the controller controls the actuator in accordance with the one or more power saving drive signals during a blanking interval between the first frame capture time period and a second frame capture time period in which a second image frame is captured, wherein the one or more time periods in which the image sensor is not being exposed comprise the blanking interval; and
the first image frame and the second image frame are consecutively captured.

11. The system of claim 10, wherein:
the controller controls the actuator in accordance with the one or more position maintenance drive signals during the second frame capture time period;
the controller controls the actuator in accordance with the one or more power saving drive signals during another blanking interval between the second frame capture time period and a third frame capture time period in which a third image frame is captured; and
the second image frame and the third image frame are consecutively captured.

12. The system of claim 9, wherein the controller is further to:
operate the camera module in one or more other modes different from the power saving mode, wherein, to operate the camera module in at least one of the one or more other modes, the controller is to:
control the actuator in accordance with one or more drive signals to hold the at least one of the lens group or the image sensor such that the lens group and the image sensor do not move relative to each other in the direction parallel to the optical axis, throughout (i) a first frame capture time period in which a first image frame is captured and (ii) a blanking interval between the first frame capture time period and a second frame capture time period in which a second image frame is captured, wherein the first image frame and the second image frame are consecutively captured;
wherein the controller switches from operating the camera module in the at least one of the one or more other modes to operating the camera module in the power saving mode in response to a determination to initiate the power saving mode.

13. The system of claim 9, wherein:
the actuator comprises a voice coil motor (VCM) actuator that includes one or more magnets and one or more coils;
to control the actuator in accordance with the one or more position maintenance drive signals, the controller determines one or more position maintenance drive currents to provide to at least one coil of the one or more coils such that the VCM actuator holds the at least one of the lens group or the image sensor at the focus position;
to control the actuator in accordance with the one or more power saving signals, the controller determines one or more power saving drive currents to provide to the at least one coil to enable movement of the at least one of the lens group or the image sensor between the focus position and the neutral position; and
the one or more power saving drive currents are lower, on average, than the one or more position maintenance drive currents.

14. The system of claim 13, wherein:
the one or more time periods in which the image sensor is not being exposed for image capture comprises a blanking interval in between consecutive image sensor exposure intervals; and
to control the actuator in accordance with the one or more power saving drive signals, the controller is to:
determine a first time period for a step-down of current provided to the at least one coil, the step-down being from a position maintenance drive current of the one or more position maintenance drive currents to a power saving drive current of the one or more power saving drive currents; and
determine a second time period for a step-up of current provided to the at least one coil, the step-up being from the power saving drive current to the position maintenance drive current;
wherein the first time period and the second time period are different subsets of the blanking interval.

15. The system of claim 9, wherein:
the one or more time periods in which the image sensor is not being exposed comprise a first time period and a second time period; and
the controller is further to:
determine, based at least in part on a first duration of the first time period, a first power saving drive signal of the one or more power saving drive signals, wherein the first power saving drive signal is associated with a first drive current provided to the actuator during the first time period; and
determine, based at least in part on a second duration of the second time period, a second power saving drive signal of the one or more power saving drive signals, wherein the second power saving drive signal is associated with a second drive current provided to the actuator during the second time period, and wherein the second drive current is different than the first drive current based on the second duration being different than the first duration.

16. The system of claim 15, wherein the first drive current or the second drive current is zero.

17. The system of claim 9, wherein:
the actuator is configured to move the lens group to provide autofocus (AF) for images captured via the camera module; and
the actuator is configured to move the lens group or the image sensor to provide optical image stabilization (OIS) movement for the images captured via the camera module.

18. A method, comprising:
implementing a power saving mode of a camera module, wherein the implementing the power saving mode comprises:
maintaining, via an actuator of the camera module and during one or more time periods in which an image sensor of the camera module is being exposed for image capture, at least one of a lens group or an image sensor at a focus position, wherein:
the lens group comprises one or more lenses; and
the image sensor is to capture light that has passed through the lens group; and
moving, during one or more time periods in which the image sensor is not being exposed for image capture, the at least one of the lens group or the image sensor, between the focus position and a neutral position;
wherein the moving the at least one of the lens group or the image sensor between the focus position and the neutral position consumes less power than the maintaining the at least one of the lens group or the image sensor at the focus position.

19. The method of claim 18, wherein the neutral position is a position at which the lens group or the image sensor settles in a resting state when no current is provided to the actuator.

20. The method of claim 18, further comprising:
implementing one or more other modes different from the power saving mode, wherein implementing at least one of the one or more other modes comprises:
holding the at least one of the lens group or the image sensor such that the lens group and the image sensor do not move relative to each other in a focus movement direction that is parallel to an optical axis of the camera module, throughout (i) a first frame capture time period in which a first image frame is captured and (ii) a blanking interval between the first frame capture time period and a second frame capture time period in which a second image frame is captured, wherein the first image frame and the second image frame are consecutively captured.

\* \* \* \* \*